United States Patent
Frenger et al.

(10) Patent No.: US 10,952,247 B2
(45) Date of Patent: Mar. 16, 2021

(54) DATA TRANSMISSION TECHNIQUE FOR A CONTENTION CHANNEL

(71) Applicant: Telefonaktiebolaget LM Ericsson (publ), Stockholm (SE)

(72) Inventors: Pål Frenger, Linköping (SE); Erik Eriksson, Linköping (SE); Jonas Fröberg Olsson, Ljungsbro (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/324,336

(22) PCT Filed: Aug. 10, 2016

(86) PCT No.: PCT/EP2016/069038
§ 371 (c)(1),
(2) Date: Feb. 8, 2019

(87) PCT Pub. No.: WO2018/028773
PCT Pub. Date: Feb. 15, 2018

(65) Prior Publication Data
US 2019/0174538 A1 Jun. 6, 2019

(51) Int. Cl.
*H04W 74/08* (2009.01)
*H04W 76/11* (2018.01)
(Continued)

(52) U.S. Cl.
CPC .......... *H04W 74/08* (2013.01); *H04L 5/0055* (2013.01); *H04W 74/002* (2013.01);
(Continued)

(58) Field of Classification Search
CPC ... H04W 74/08; H04W 76/11; H04W 74/002; H04W 72/0406; H04W 72/1284; H04L 5/0055
See application file for complete search history.

(56) References Cited

U.S. PATENT DOCUMENTS 7,957,298 B2 * 6/2011 Yi ....................... H04W 74/002
370/242
8,917,686 B2 * 12/2014 Lee .................... H04W 74/0866
370/329
(Continued)

FOREIGN PATENT DOCUMENTS

EP 3021619 A1 * 5/2016 ............ H04W 52/48
EP 3021619 A1 5/2016
(Continued)

OTHER PUBLICATIONS

Unknown, Author, "Contention Based Uplink Transmissions", 3GPP TSG-RAN WG2 #66bis, R2-093812, Los Angeles, CA, US,, Jun. 29-Jul. 3, 2009, 1-4.
(Continued)

*Primary Examiner* — Chi H Pham
*Assistant Examiner* — Ji-Hae Yea
(74) *Attorney, Agent, or Firm* — Sage Patent Group

(57) ABSTRACT

A technique for transmitting data (504) from a first station to a second station on a contention-based radio channel is described. As to a method aspect of the technique, the first station obtains a transmit identifier (506) for the first station from a set of transmit identifiers; transmits control information (502) including the transmit identifier (506) to the second station; and transmits the data (504) to the second station according to the control information (502), wherein the data includes a station identifier (508) for the first station, the station identifier (508) or a combination of the station
(Continued)

identifier and the transmit identifier (506) being indicative of the first station.

17 Claims, 17 Drawing Sheets

(51) Int. Cl.
  *H04L 5/00* (2006.01)
  *H04W 74/00* (2009.01)
  *H04W 72/04* (2009.01)
  *H04W 72/12* (2009.01)

(52) U.S. Cl.
  CPC ........ *H04W 76/11* (2018.02); *H04W 72/0406* (2013.01); *H04W 72/1284* (2013.01)

(56) References Cited

U.S. PATENT DOCUMENTS

| | | | | |
|---|---|---|---|---|
| 8,964,658 | B2 | 2/2015 | Chen et al. | |
| 2003/0028649 | A1* | 2/2003 | Uhlik | H04L 69/169 709/228 |
| 2010/0177701 | A1* | 7/2010 | Maheshwari | H04L 1/1883 370/328 |
| 2010/0227617 | A1* | 9/2010 | Jung | H04W 8/26 455/438 |
| 2010/0309870 | A1* | 12/2010 | Wengerter | H04L 1/1893 370/329 |
| 2011/0292895 | A1* | 12/2011 | Wager | H04W 74/006 370/329 |
| 2013/0111044 | A1* | 5/2013 | Cherian | H04W 76/10 709/228 |
| 2014/0241262 | A1* | 8/2014 | Novak | H04W 72/042 370/329 |
| 2015/0189546 | A1* | 7/2015 | Earnshaw | H04L 1/1858 370/329 |
| 2016/0174215 | A1* | 6/2016 | Zhang | H04W 72/0446 370/329 |

FOREIGN PATENT DOCUMENTS

| | | | | |
|---|---|---|---|---|
| WO | | 2015137632 A1 | 9/2015 | |
| WO | WO-2015137632 A1 | * | 9/2015 | ........ H04W 72/1284 |

OTHER PUBLICATIONS

Unknown, Author, "Details of Latency Reduction Alternatives", 3GPP TSG-RAN WG2 #68, R2-096759, Jeju, Korea, Nov. 9-13, 2009, 1-7.

Unknown, Author, "UL Contention Based Access for Latency Reduction", 3GPP TSG-RAN2 #90 Meeting, R2-152383, Fukuoka, Japan, May 25-29, 2015, 1-6.

European Office Action Communication dated Jul. 10, 2020 for EP Application No. 16748318.9, 7 pages.

* cited by examiner

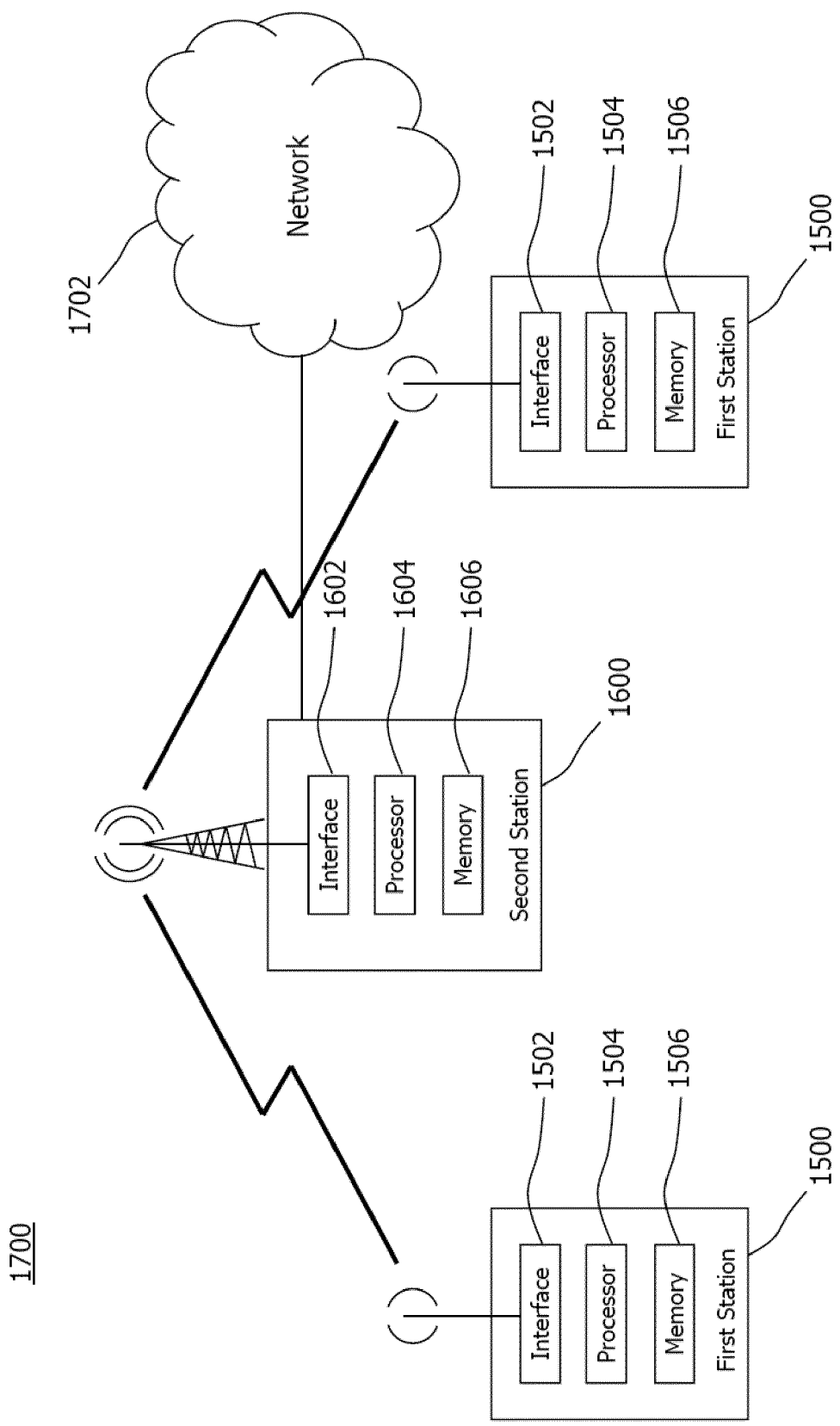

DATA TRANSMISSION TECHNIQUE FOR A CONTENTION CHANNEL

TECHNICAL FIELD

The present disclosure generally relates to a technique for transmitting data on a contention-based radio channel. More specifically, and without limitation, methods and devices are provided for transmitting data from one station to another station using the contention-based radio channel.

BACKGROUND

For conventional cellular Radio Access Technologies (RATs) such as Long Term Evolution (LTE) according to the 3rd Generation Partnership Project (3GPP), the base station (e.g., the evolved Node B or eNB) defines a frame structure in the time domain and is responsible for allocating radio resources by transmitting Downlink Control Information (DCI) to wireless devices (e.g., User Equipments or UEs) in Radio Resource Control (RRC) connected state with the eNB. Each UE in the RRC connected state is assigned a Radio Network Temporary Identifier (RNTI) that eNB and UE use in their communication. The DCI includes a scheduling grant for allocating uplink radio resources and a scheduling assignment for allocating downlink radio resources.

Modern cellular RATs also use contention-based radio channels, i.e. channels requiring a contention-based radio access to a shared medium. Contention-based radio channels allow spectral coexistence of different RATs, which is used, e.g., by LTE in unlicensed spectrum, LTE License-Assisted Access and MulteFire. For LTE downlink, the eNB determines the time occasions when to transmit to the UE. These occasions are known to the UEs by means of the DCI. The eNB indicates which UE is addressed by encoding the DCI with a Cyclic Redundancy Check (CRC) value that is scrambled with the RNTI of the UE that the eNB addresses. This solution is an efficient way to indicate the UE identity of the intended downlink receiver. An alternative solution could have been to let the DCI comprise the RNTI, which would have been less spectral efficient. For LTE uplink, all transmissions are scheduled by the eNB and, hence, the UE identity of each uplink transmission is known to the eNB. Therefore, the UE identity is not indicated in the uplink transmissions that the UE performs.

Non-cellular RATs such as Wi-Fi according to the standard family IEEE 802.11 use unscheduled contention-based access for both downlink and uplink. Each data transmission is preceded with control information that indicates the encoding format of the subsequent data transmission. The MAC address of the transmitting station is comprised in the data frame to indicate the station identity. Consequently, soft-combining of multiple data transmissions is not possible, since the receiving station (e.g., an Access Point) does not know which transmissions to combine.

Contention-based radio channels are particularly suitable for certain machine-type communication (MTC), e.g., for stations that transmit intermittently or sporadically small amounts of data compared to the channel capacity. Using contention-based radio channels can reduce latency, radio resource consumption and energy consumption. Furthermore, unscheduled contention-based access allows to largely increase the number of wireless stations per base station. However, including a CRC value scrambled with a station identifier in the control information (e.g., analogously to the DCI in LTE) is not feasible, since the number of CRC attempts at the receiving station as well as the rate of control information accidentally associated with an arbitrary station increases, as the station density increases. Including the identity of the transmitting station as explicit bits in the control information would reduce the spectral efficiency.

Document U.S. Pat. No. 8,964,658 B2 teaches that an eNB transmits contention-based configuration information and an uplink contention-based grant to a UE. The UE derives a plurality of transmission opportunities from the uplink contention-based grant and, in response, transmits uplink contention-based data via one of the transmission opportunities.

However, this conventional access requires a bidirectional negotiation with the eNB before the UE can start its uplink transmission. Furthermore, this conventional access imposes a scheduling grant mechanism in addition to the contention-based access. Thus, the latency of the uplink data transmission can be insufficient for online activities, cloud-based services and MTC.

In order to reduce the overall latency of a contention-based transmission, document U.S. Pat. No. 8,964,658 B2 further teaches eliminating a separate phase of contention resolution in that the uplink transmission radio resource carriers both the uplink contention-based data and UE-selected signature information.

However, this conventional uplink transmission excludes soft-combining at the eNB, since the eNB is unable to determine the UE from which an initially not decodable data transmission originates.

SUMMARY

Accordingly, there is a need for a data transmission technique that allows reducing latency and/or energy consumption on a contention-based radio channel without scarifying spectral efficiency in at least some scenarios. Alternatively or in addition, there is a need for a data transmission technique that allows soft-combining using a contention-based radio channel without scarifying spectral efficiency in same or some other scenarios.

As to one aspect, a method of transmitting data from a first station to a second station on a contention-based radio channel is provided. The method comprises or triggers a step of obtaining a transmit identifier for the first station from a set of transmit identifiers; a step of transmitting control information including the transmit identifier to the second station; and a step of transmitting the data to the second station according to the control information, wherein the data includes a station identifier for the first station, the station identifier or a combination of the station identifier and the transmit identifier being indicative of the first station.

The steps may be performed or controlled by the first station.

By virtue of the transmit identifier, the second station may be capable of detecting contending stations (e.g., including the first station), distinguishing and/or relating data transmissions (e.g., including the data transmission from the first station) on the contention-based radio channel. For example, two or more transmissions of the first station relating to the same data can be subject to soft-combining at the second station. The second station may be capable of distinguishing and/or relating two or more data transmissions, even if at least one of the two or more data transmissions is not successful received (e.g., not decodable at the second station).

At least some embodiments may use a transmit identifier comprised in the control information and indicating the transmitter identity. The technique can enable a spectral efficient way to use retransmission combining of contention-based transmissions. The transmit identifier may map the received data to correct the received data representation (e.g., soft-bits) in a higher-layer instance (e.g., using a HARQ process).

The control information may carry data-coding information of the data transmission intended to the second station. Alternatively or in addition, the control information may carry soft-combining information, which may enable the second station to combine a failed (e.g., not successfully decoded) data transmission with a retransmission of the data to increase the likelihood for the combined soft-bits to be correctly decoded.

The data transmission and the control information transmission may be related, e.g., temporally, structurally, by reference and/or according to a communication protocol. For example, the control information may include a reference to the data. The reference may be defined in terms of time and/or frequency. The reference may be defined relative to the control information transmission.

Alternatively or in addition, the data and the control information may be transmitted within the same message of the communication protocol, the same frame, the same subframe or the same slot of a time domain structure. The control information may be transmitted prior to transmitting the data. The data may be transmitted a predefined number of transmission symbols (e.g., 3 or 4 symbols) after transmitting the control information.

Alternatively or in addition, any access for transmission on the contention-based radio channel may require a contention process. The contention process may result in a transmit opportunity (TXOP) for transmitting on the contention-based radio channel. The control information and the data may be transmitted within the same TXOP.

By way of example, the TXOP may be about 0.5 ms, 1 ms, 1.5 ms, 3.0 ms or 4 ms. Alternatively or in addition, the TXOP may be defined in units of one or more slots or subframes. While the transmission of the control information and the data may be related in the time domain, the transmission of the control information and the data may be transmitted on distinct channels in the frequency domain. The contention-based radio channel may also be referred to as contention channel or contention Physical Data Channel (cPDCH).

The first station may receive, await (e.g., for a response time), and/or not receive a response including the transmit identifier from the second station. Based on the response or the absence of the response, the first station may be capable of determining a successful transmission of the data or detecting a collision in the transmission on the contention-based radio channel. Collisions can be rare for first stations that transmit intermittently or sporadically and/or a rather small amount of data (e.g., a fraction of radio transmission time per time may be less than $1/100$, e.g., less than $1/1000$).

The transmit identifier may be maintained, e.g., for one or more transmissions of the data or further data, and/or for a transmit identifier time (i.e., a certain term or period). The data transmission may be repeated with or without repeating the transmission of the control information, e.g., depending on the response or the absence of the response. A repeated data transmission without repeating the control information transmission may be based on the same control information.

"Including" any one of the identifiers (e.g., the transmit identifier) may be implemented by implying, encoding and/or scrambling the identifier.

The transmit identifier may be expressly included (e.g., encoded) in the control information. Alternatively or in addition, the transmit identifier may be implied (e.g., scrambled) in the control information transmitted to the second station.

By way of example, the control information may be protected by a cyclic redundancy check (CRC) value. The transmit identifier may be scrambled with the CRC of the control information. The transmit identifier may be "scrambled" with the CRC by modulo-2 addition (i.e. bit-wise XOR). E.g., the transmit identifier "included" in the control information may be a 4-bit value. The CRC of the control information may be a 16-bit value. For example, the 4 bits representing the transmit identifier may be added to 4 bits out of the 16 bits representing the CRC value (e.g., the 4 most signification bits of the CRC value).

The first station may be associated with the second station and/or a radio network. The radio network may comprise the first station. The first station may be associated or comprised, if the second station is attached, registered, included and/or wirelessly connected with the second station and/or the radio network.

The second station may control the radio network. The radio network may comprise the first station as a result of an association process, e.g., at the second station. The association process may include an attach process, an authorization process, a registration process and/or an inclusion process.

The radio network may comprise a plurality of such first stations. The second station may provide contention-based radio access to each of the plurality of first stations and/or may be accessible by each of the plurality of first stations, e.g., via the contention-based radio channel.

By scrambling the transmit identifier with a CRC value of the control information, a number of CRC attempts at the second station and/or a rate of reception events falsely assigned to a station in the radio network can be reduced compared to a conventional technique that scrambles the CRC value with a unique station identifier.

The method may further comprise or trigger the step of obtaining the station identifier for the first station from the second station. The station identifier for the first station and/or the contention-based radio channel may be assigned to the first station by the second station, e.g. in the association process. Optionally, the first station receives a station identifier for the second station in the association process, or another process before associating with the second station.

The contention-based radio channel may be shared by multiple stations (e.g., including the first station). The plurality of first stations may be a (e.g., proper) subset of the multiple stations.

Each of the plurality of first stations (including the first station) may be associated and/or within range for radio communication with the second station. The second station and/or the plurality of first stations may define the radio network. The contention-based radio channel may be shared by multiple radio networks, e.g., including and not limited to the radio network defined by the second station.

The station identifier of the first station may be different from the transmit identifier of the first station. The station identifier, or the combination of the transmit identifier and the station identifier, may uniquely identify the first station, e.g., uniquely within the radio network. The station identifier of the first station may include the MAC address of the first station, the UE identity of the first station, the IMSI of the first station, the RNTI (e.g., the C-RNTI) of the first station, the serial number of the first station or a combination thereof.

The transmit identifier for the first station may be insufficient for identifying the first station within the radio network. For example, different first stations in the radio network may use the same transmit identifier. E.g., in disjoint periods of time, different first stations may use the same transmit identifier.

The first station may transmit the data on the contention-based radio channel. The first station may transmit the control information on the contention-based radio channel or on a control channel other than the contention-based radio channel. The control channel may be contention-based, contention-free or scheduled.

The first station may be a wireless device, e.g., a user equipment (UE), e.g., a mobile station, and/or a device for machine-type communication (MTC), e.g., a sensor or an actuator. The first station may also be referred to as a data transmitter.

The second station may be another wireless device and/or a base station, e.g., an evolved Node B (eNB) or an access point. The second station may also be referred to as a data receiver. The control information may also be referred to as Uplink Control Information (UCI).

The station identifier of the first station may be an International Mobile Subscriber Identifier (IMSI) of the first station or a Radio Network Temporary Identifier (RNTI), e.g., a Cell RNTI (C-RNTI) of the first station, e.g., according to 3GPP LTE or 5G New Radio. Alternatively or in addition, the station identifier of the first station may be a MAC address or an association identifier (AID) of the first station, e.g., according to the standard family IEEE 802.11 for Wi-Fi.

The station identifier of the second station may include a cell identifier (cell ID), an eNB identifier (eNB-ID) and/or E-UTRAN cell identifier (ECI), e.g., according to 3GPP LTE or 5G New Radio. Alternatively or in addition, the station identifier of the second station may include a Service Set Identifier (SSID) or a Basic SSID (BSSID) of the second station, e.g., according to the standard family IEEE 802.11 for Wi-Fi.

Alternatively or in addition, the first station may receive control information (e.g., a message including a scheduling grant) from the second station. The control information from the first station and/or the data from the first station may be transmitted according to the control information from the second station. The control information received from the second station may include an allocation of radio resources on the contention-based radio channel (e.g., a resource block allocation). The control information received from the second station may also be referred to as Downlink Control Information (DCI).

The transmit identifier for the first station and/or the set of transmit identifiers may be obtained (e.g., received) from the second station. Alternatively or in addition, obtaining the transmit identifier may include receiving the set of transmit identifiers from the second station.

"Receiving" the set of transmit identifiers may encompass receiving a set of (e.g., available) transmit identifiers or receiving an indicator of the set. The indicator may comprise a range of the set, a number of bits for an (e.g., unsigned) integer representation of the transmit identifiers in the set and/or a bitmask (e.g., indicating a subset of bits out of the bits representing the transmit identifiers in the set).

The first station may autonomously generate the transmit identifier. Obtaining the transmit identifier may include generating a pseudo-random number from the set of transmit identifiers as the transmit identifier for the first station.

Alternatively or in addition, the transmit identifier may be, or may be based on, a hash value, e.g., in the set of transmit identifiers. The transmit identifier for the first station may be obtained by evaluating a hash function. The hash function may evaluate to the transmit identifier or the transmit identifier may be generated depending on a result of the hash function. For example, the hash function may map the station identifier to the transmit identifier. The hash function may map to the set of transmit identifiers. E.g., the set of transmit identifiers may be the codomain of the hash function or the image of the hash function.

Furthermore, the transmit identifier may be, or may be based on, a combination of the pseudo-random number and the hash value.

The first station and/or the second station may determine transmit identifiers currently used by other first stations in the radio network on the contention-based radio channel. The first station and/or the second station may exclude the currently used transmit identifiers from the set of transmit identifiers.

Obtaining the transmit identifier may include receiving the transmit identifier for the first station from the second station. For example, the control information (e.g., the scheduling grant) received from the second station or another message received from the second station may include (e.g., expressly or implicitly) the transmit identifier, the set of transmit identifiers, and/or the indicator of the set. The transmit identifier for the first station, the set of transmit identifiers and/or the indicator of the set may be received at the first station upon a request transmitted from the first station to the second station.

The transmit identifier for the first station, the set of transmit identifiers and/or the indicator of the set may be implicitly obtained at the first station. For example, the transmit identifier for the first station, the set of transmit identifiers and/or the indicator of the set may be implied in a message (e.g., including the control information, particularly including the scheduling grant) from the second station without being encoded in the message. By receiving the message from the second station, the transmit identifier for the first station, the set of transmit identifiers and/or the indicator of the set may be determined at the first station based on the second station being the source of the message.

As an alternative example or in addition, the transmit identifier for the first station, the set of transmit identifiers and/or the indicator of the set may be determined at the first station (e.g., without receiving a message from the second station or independently of a message from the second station, particularly for a non-scheduled data transmission) based on the first station and the second station being source and destination for the data transmission, e.g., based on the combination of the station identifier of the first station and the station identifier of the second station.

The transmit identifier for the first station, the set of transmit identifiers and/or the indicator of the set may be obtained by deriving the transmit identifier and/or the set from the station identifier of the first station, from the IMSI of the first station, from the RNTI (e.g., the C-RNTI) of the first station, from the station identifier of the second station, from a combination of the station identifier of the first station and the station identifier of the second station, from a serial number of the first station, from a serial number of the second station and/or from a combination of serial numbers of hardware components in the first station.

A response to the data transmission from the second station may include or imply the transmit identifier of the first station. The first station may receive the response, and/or listen for receiving the response, on the contention-based radio channel or another channel. The other channel may be a schedule-based radio channel and/or a (e.g., downlink) control channel dedicated for control signals. The first station may listen for receiving the response by scanning the respective channel for its transmit identifier.

The response may imply the transmit identifier based on the first station and the second station being destination and source for the response, e.g., based on the combination of the station identifier of the first station and the station identifier of the second station.

The response may include or imply an acknowledgment (ACK) for the data being successfully received at the second station or a negative acknowledgment (NACK) for the data not being successfully received at the second station. The data transmission from the first station and/or the data reception at the second station may be "not successful", if the second station receives the control information from the first station without receiving the associated data (e.g., due to a collision during the data transmission) and/or if the received data is not successfully decoded (e.g., as indicated by a negative CRC for the data).

The first station may retransmit the data to the second station. The step of retransmitting the data may include retransmitting control information including the transmit identifier.

By way of example, the retransmitted control information may include only the transmit identifier. At least some or all fields or options of the control information (e.g., other than the transmit identifier) may be not included in the retransmission. Fields or options of the control information that are not retransmitted may be defined by the control information transmission (e.g., the prior or initial transmission of the control information underlying the retransmission and/or related to the transmit identifier).

The retransmission of the control information may use the same channel as the control information transmission (e.g., the prior or initial transmission of control information including the transmit identifier). The retransmitted control information may be transmitted on the contention-based radio channel or another channel. The other channel may be a schedule-based radio channel and/or an (e.g., uplink) control channel dedicated for control signals.

The retransmission of the data may use the same channel as the data transmission (e.g., the prior or initial data transmission underlying the retransmission and/or related to the transmit identifier) or another channel. The other channel may be indicated in the retransmitted control information from the first station or indicated in the response from the second station.

The transmitted data may be encoded according to a first redundancy version indicated in the transmitted control information. The retransmitted data may be encoded according to a second redundancy version indicated in the retransmitted control information. The second redundancy version may be other than the first redundancy version.

The data may be retransmitted, if the response from the second station (or another message including the transmit identifier) includes or implies a NACK for the data not being successfully received at the second station. The response (or the other message including the transmit identifier) may include or imply the ACK or the NACK by including at least one of a reference signal or a combination of reference signals representing ACK or NACK; a bit representing ACK or NACK; control information implying an ACK or NACK; a scheduling grant implying a NACK; a retransmission grant implying a NACK; and a clear-to-send indication implying a NACK.

The data may be retransmitted, if the response (or the other message including the transmit identifier) includes or implies a scheduling grant for the retransmission. The scheduling grant may be received from the second station. The scheduling grant may be received in the response (e.g., in the NACK message) or the other message. The other message may be a separate control message. The other message may be received at the first station from second station.

The scheduling grant may be indicative of a scheduled radio resource. The data may be retransmitted according to the scheduling grant. The scheduling grant may be indicative of a scheduled radio resource for the retransmission of the data and, optionally, for the retransmission of the control information. The data may be retransmitted using the scheduled radio resource.

Herein, the term radio resource may refer to at least one resource element, at least one transmission symbol or at least one resource block. The radio resource may be specified (e.g., delimited) in time and/or frequency. Each resource element may carry one modulation symbol. Each transmission symbol may comprise a plurality of modulation symbols transmitted simultaneously on respective subcarriers. The resource block may span 7 symbols in the time domain and 12 subcarriers in the frequency domain.

The scheduled radio resource may be on the contention-based radio channel or a control channel other than the contention-based radio channel. The scheduling grant may specify at least a time frame or subframe for the retransmission. Accessing the scheduled radio resource may further require performing the contention process.

Alternatively or in addition, the data may be retransmitted on a contention-free radio resource. The contention-free radio resource may be a radio resource available to the first station without a further contention process. The contention-free radio resource may include a time interval on the contention-based radio channel after a prior transmission on the contention-based radio channel, e.g., within the TXOP initiated by the prior transmission. The prior transmission may be the data transmission (e.g., the data transmission underlying the retransmission and related to the transmit identifier).

Alternatively or in addition, the contention-free radio resource may include a radio resource on a contention-free channel or radio carrier (other than the contention-based radio channel or a radio carrier used for the contention-based radio channel), e.g., in licensed spectrum.

The data transmission may start a response timer. Upon expiry of the response timer, without having received the response including the transmit identifier from the second station, the transmit identifier for the first station may be released. The transmit identifier may be released by at least one of the first station and the second station. Furthermore, the transmission of the data and the control information from the first station to the second station may be repeated.

The step of repeating the transmission of the data may include obtaining another transmit identifier and transmitting control information including the other transmit identifier from the first station to the second station.

The first station may detect a collision on the contention-based radio channel by the absence of the response upon expiry of the response timer. Alternatively or in addition, the second station may refrain from transmitting a response including the transmit identifier, because the same transmit identifier is already used by another station (e.g., as indicated by a list of used transmit identifiers maintained at the second station).

Alternatively or in addition, receiving the response from the second station may start or restart a transmit identifier timer at the first station. The transmit identifier for the first station may be released upon expiry of the transmit identifier timer.

Alternatively or in addition, releasing the transmit identifier at the first station may be triggered by the second station. A control message from the second station for releasing the transmit identifier may be received. The control message may include or imply the transmit identifier. The first station may release the transmit identifier in response to the control message. Releasing the transmit identifier may include repeating the step of obtaining the transmit identifier for the first station, which replaces the released transmit identifier.

By replacing the transmit identifier, repeating the transmission of control information including the replacing transmit identifier and transmitting the data according to the repeated control information, conflicting transmit identifiers of different transmitting stations (including the first station) can be avoided. A cardinality of the set of transmit identifiers may be less than the number of first stations in the radio network or the number of first stations associated with the second station.

The second station may define the number of stations. The stations associated with the second station may include the first station.

The second station may be a controlling station of the radio network or a base station of the radio network. Alternatively or in addition, the second station may be a station connected or connectable to a gateway. Each station (e.g., including the first station) in the radio network may have to be registered with the second station for transmitting on the contention-based radio channel.

The associated stations may include stations in a Radio Resource Control (RRC) connected state with the second station. The station identifier may be a Radio Network Temporary Identifier (RNTI). The second station may include some functionality of an evolved Node B (eNB), e.g., according to 3GPP. Alternatively or in addition, the associated stations may include stations assigned an association identifier (AID). The second station may include some functionality of an access point, e.g., according to the standard family IEEE 802.11 (or Wi-Fi). Alternatively or in addition, the associated stations may be included or registered at the second station. The second station may include some functionality of a network controller, e.g., according to the network protocol Z-Wave, ZigBee and/or X10.

The number of associated stations and/or stations included in the radio network may include stations within a range of radio communication (e.g., within range of mutual radio communication or within range of radio communication with the second station) and/or stations previously included or registered with the radio network or the second station (e.g., according to an inclusion protocol and, optionally, not yet excluded). Alternatively or in addition, the number of station may be a maximum number of stations connectable in the radio network.

The transmit identifier may uniquely identify a subset of the plurality of stations in the radio network. E.g., the transmit identifier may uniquely identify one of the stations currently transmitting data in the network and/or to the second station.

A size of the transmit identifier may correspond to a first number of bits. A size of the station identifier may correspond to a second number of bits that is greater than the first number of bits. The size of the transmit identifier may be limited, e.g., limited to the predefined first number of bits. The size of the transmit identifier may be decoupled from, or independent of, the number of stations in the radio network.

By way of example, the first number of bits may depend on a rate at which any of the first stations (not necessarily the same first station) is transmitting data to the second station. The second number of bits may depend on the number of stations in the radio network, the number of stations associated with the second station and/or the number of stations within range of radio communication with the second station.

The control information may be transmitted according to a first transmission format. The data may be transmitted according to a second transmission format that is different from the first transmission format. The transmission according to the first transmission format may include more redundancy than the transmission according to the second transmission format.

By including the station identifier in the data, which (e.g., in combination with the transmit identifier) uniquely specifies the first station, the spectral efficiency can be improved compared to a conventional technique that includes a unique station identifier in the control information. For example, including the station identifier in the data transmitted using the second format transmission may be more spectrally efficient than (e.g., explicitly) including a (e.g., unique) station identifier in the control information transmitted using the first transmission format.

The "transmission format" may relate to modulation and/or coding. The control information may be transmitted according to a first modulation scheme and/or a first coding scheme that are different from a second modulation scheme and/or a second coding scheme used for transmitting (or retransmitting) the data. The first modulation scheme and/or the first coding scheme may include more redundancy in the transmission of the control information than the redundancy included in the data transmission according to the second modulation scheme and/or the second coding scheme. The transmission format may define a transmission rate (e.g., a maximum transmission rate) and/or the redundancy. A transmission format having a lower transmission rate and/or a higher redundancy may be referred to as more robust.

The modulation scheme may include at least one of QPSK, 16QAM and 64QAM. The coding scheme may relate to a Viterbi code, a turbo code, rate matching and/or puncturing.

The control information transmitted from the first station may be indicative of at least one of a modulation scheme, a coding scheme, a HARQ process number, new data and a redundancy version. The transmit identifier may include the HARQ process number, the transmit identifier may imply the HARQ process number, and/or the transmit identifier may be equal to the HARQ process number.

A contention-based radio resource may be used for the data transmission and/or and the data retransmission. The contention-based radio resource may be a radio resource on the contention-based radio channel. Alternatively or in addition, the contention-based radio resource may be a resource accessible to the first station by performing a contention process.

At least one of the transmission and the retransmission on the contention-based radio channel may be based on a contention process. The contention process may comprises at least one of including the transmit identifier in the control information of the data transmission; performing a clear channel assessment (CCA) of the contention-based radio channel; and performing a backoff mechanism. The data transmission, or any transmission, on the contention-based radio channel may be based on the contention process.

The backoff mechanism may include deferring the data transmission (e.g., after a positive CCA) and/or deferring the data retransmission (e.g., after a collision detection) by a backoff time. The backoff mechanism may be implemented by initializing a backoff timer by the backoff time. Expiry of the backoff timer may trigger the transmission or retransmission. The backoff time may be a random value (e.g., for a random-backoff mechanism) or may be increased (e.g., doubled) in to response to each collision detection (e.g., for an exponential-backoff mechanism). A beginning of the backoff time may be triggered or defined by the positive result of the CCA, the collision detection and/or the data transmission that collided. The CCA and/or the backoff mechanism may be part of a Listen-Before-Talk (LBT) process.

The contention-based radio channel may use unlicensed spectrum.

As to another aspect, a method of receiving data from a first station at a second station on a contention-based radio channel is provided. The method comprises or triggers a step of receiving control information including a transmit identifier from the first station; a step of maintaining, based on the received transmit identifier, a list of transmit identifiers from a set of transmit identifiers; and a step of receiving the data from the first station according to the control information, wherein the data includes a station identifier for the first station, the station identifier or a combination of the station identifier and the transmit identifier being indicative of the first station.

The steps may be performed or controlled by the second station.

"Receiving" the data may not necessarily imply that the data has been successfully received (e.g., successfully decoded) at the second station. The data may be successfully received, e.g., if (e.g., and only if) the data has been successfully decoded and/or verified by a CRC protecting the data. The data may be not successfully received, e.g., if the CRC is negative.

The list may include or may be indicative of transmit identities that are currently available (e.g., not used by and/or assigned to any station, e.g., including the first station). Alternatively or in addition, the list may include or may be indicative of transmit identities for which a retransmission is expected and/or a Hybrid Automatic Repeat Request (HARQ) process is pending.

The second station may determine a transmit identifier (out of the set of transmit identities) that is not on the list. The determined transmit identifier may be transmitted to the first station.

The list may be indicative of transmit identifiers for which control information has been successfully received and/or for which data has not been successfully received. The second station may buffer soft-bits representing the not successfully received data. The soft-bits may be buffered in association with the transmit identifier for each data reception. A NACK message including the transmit identifier may be transmitted to the first station.

The method may further comprise any feature disclosed in the context of the one method aspect and/or one or more steps corresponding to any of the steps of the one method aspect.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the radio network and/or the Internet.

As to one device aspect, a device for transmitting data from a first station to a second station on a contention-based radio channel is provided. The device may be configured to perform the one method aspect. Alternatively or in addition, the device comprises an obtaining unit configured to obtain a transmit identifier for the first station from a set of transmit identifiers; a transmitting unit configured to transmit control information including the transmit identifier to the second station; and the transmit unit further configured to transmit the data to the second station according to the control information, wherein the data includes a station identifier for the first station, the station identifier or a combination of the station identifier and the transmit identifier being indicative of the first station.

As to another device aspect, a device for receiving data from a first station at a second station on a contention-based radio channel is provided. The device may be configured to perform the other method aspect. Alternatively or in addition, the device comprises a receiving unit configured to receive control information including a transmit identifier from the first station; a maintaining unit configured to maintain, based on the received transmit identifier, a list of transmit identifiers from a set of transmit identifiers; and the receiving unit further configured to receive the data from the first station according to the control information, wherein the data includes a station identifier for the first station, the station identifier or a combination of the station identifier and the transmit identifier being indicative of the first station.

As to one further aspect, a first station, e.g. a wireless device, for transmitting data to a second station on a contention-based radio channel is provided. The first station may be wirelessly connected or connectable to a radio network. The first station may comprise the device according to the one device aspect or may be configured to perform the one method aspect. Alternatively or in addition, the first station comprises an identifier module for obtaining a transmit identifier for the first station from a set of transmit identifiers; a transmit module for transmitting control information including the transmit identifier to the second station; and the transmit module further for transmitting the data to the second station according to the control information, wherein the data includes a station identifier for the first station, the station identifier or a combination of the station identifier and the transmit identifier being indicative of the first station.

As to another further aspect, a second station, e.g. a network node, for receiving data from a first station on a contention-based radio channel is provided. The second station may provide wireless connectivity in a radio network. The network node may comprise the device according to the other device aspect or may be configured to perform the other method aspect. Alternatively or in addition, the network node comprises a receive module for receiving control information including a transmit identifier from the first station; an identifier module for maintaining, based on the received transmit identifier, a list of transmit identifiers from a set of transmit identifiers; and the receive module further for receiving the data from the first station according to the control information, wherein the data includes a station identifier for the first station, the station identifier or a combination of the station identifier and the transmit identifier being indicative of the first station.

The devices and/or the stations may further include any feature disclosed in the context of the method aspects. Particularly, any one of the units and modules, or a dedicated unit or module, may be configured to perform one or more of the steps of any one of the method aspects.

BRIEF DESCRIPTION OF THE DRAWINGS

Further details of embodiments of the technique are described with reference to the enclosed drawings, wherein:

FIG. 17 shows a schematic block diagram of a network environment including at least two embodiments of the first station and at least one embodiment of the second station.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G Radio Access Technology (RAT) such as 3GPP New Radio (NR) technology, it is readily apparent that the technique described herein may also be implemented in any other wireless communication network, including Long Term Evolution (LTE), LTE-Advanced, a Wireless Local Area Network (WLAN) according to the standard family IEEE 802.11, a Worldwide Interoperability for Microwave Access (WiMAX) according to the standard family IEEE 802.16, ZigBee, Z-Wave or X10.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
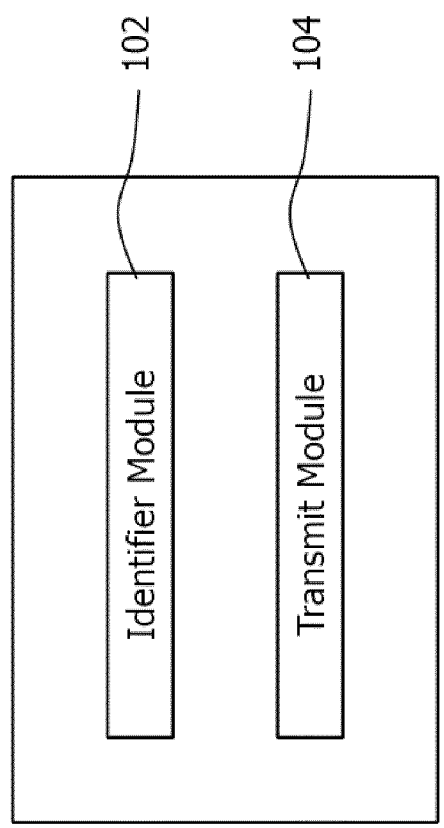
FIG. 1 shows a schematic block diagram of a device for transmitting data to a second station on a contention-based radio channel.

FIG. 1 schematically illustrates a block diagram of a device 100 for transmitting data from a first station to a second station on a contention-based radio channel. The device 100 comprises an identifier module 102 that obtains a transmit identifier for the first station from a set of transmit identifiers. The device 100 further comprises a transmit module 104 that transmits, to the second station, control information including the transmit identifier and the data according to the control information. The data (e.g., a data section of a message from the first station, which also comprises the control information) includes a station identifier for the first station. The station identifier or a combination of the station identifier and the transmit identifier is indicative of the first station.

The device 100 may be embodied by the first station. A plurality of stations including the first station (e.g., a plurality of such first stations) is in wireless connectivity or association with the second station. This plurality of associated or wirelessly connected stations is referred to as a radio network. The radio network may include stations that are configured for radio communication with the second station. Some of the plurality of stations (e.g., a majority of the plurality of stations) may be in an energy-saving state, e.g., without transmitting on the contention-based radio channel for sleeping periods longer than a transmitting period required for the transmissions 304 and 306. E.g., the sleeping period may include one or more minutes or one or more hours.

Figure 2:
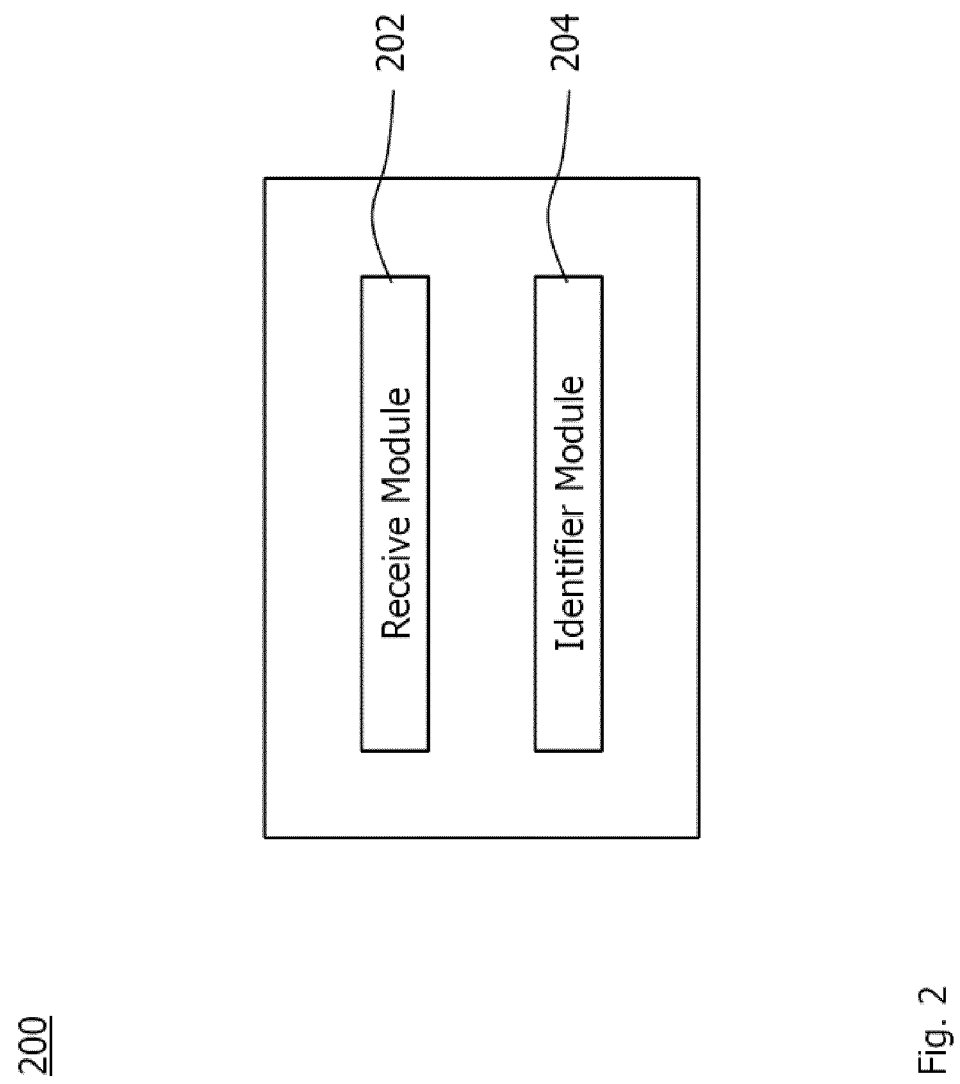
FIG. 2 shows a schematic block diagram of a device for receiving data from a first station on a contention-based radio channel.

FIG. 2 schematically illustrates a block diagram of a device 200 for receiving data from a first station at a second station on a contention-based radio channel. The device 200 comprises a receive module 202 that receives or triggers reception of control information including a transmit identifier from the first station. The device 200 further comprises an identity module 204 that maintains a list of transmit identifiers from a set of transmit identifiers based on the received transmit identifier. The receive module 202 receives or triggers reception of the data from the first station according to the control information. The data includes a station identifier for the first station. The station identifier or a combination of the station identifier and the transmit identifier is indicative of the first station.

The device 200 may be embodied by the second station. The second station may determine, e.g., based on the transmit identifier and/or the station identifier, whether or not to communicate with any station transmitting on the contention-based radio channel. The second station may define the radio network.

The station identifier or a combination of the station identifier and the transmit identifier may be uniquely indicative of the first station within the radio network. The transmit identifier may be too short for uniquely identifying the first station within the radio network.

Figure 3:
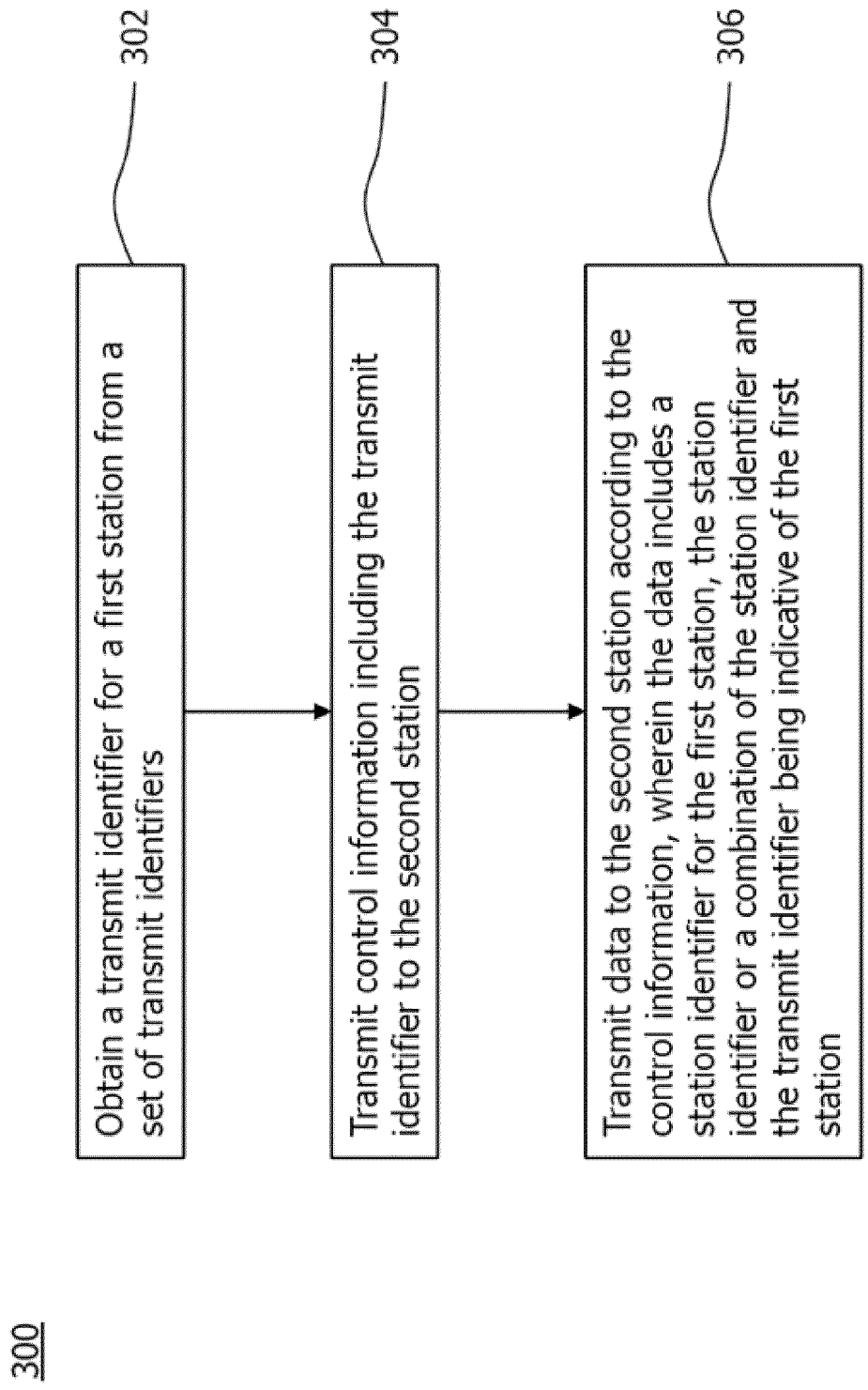
FIG. 3 shows a flowchart for a method of transmitting data from a first station to a second station on a contention-based radio channel, which is implementable by the device of FIG. 1.

FIG. 3 shows a method 300 of transmitting data from a first station to a second station on a contention-based radio channel. The method comprises a step 302 of obtaining a transmit identifier for the first station from a set of transmit identifiers; a step 304 of transmitting control information including the transmit identifier to the second station; and a step 306 of transmitting the data to the second station according to the control information, wherein the data includes a station identifier for the first station, the station identifier or a combination of the station identifier and the transmit identifier being indicative of the first station.

The method 300 may be performed by the device 100, e.g., at the first station. For example, the module 102 may perform the step 302. The module 104 may perform the steps 304 and 306.

Figure 4:
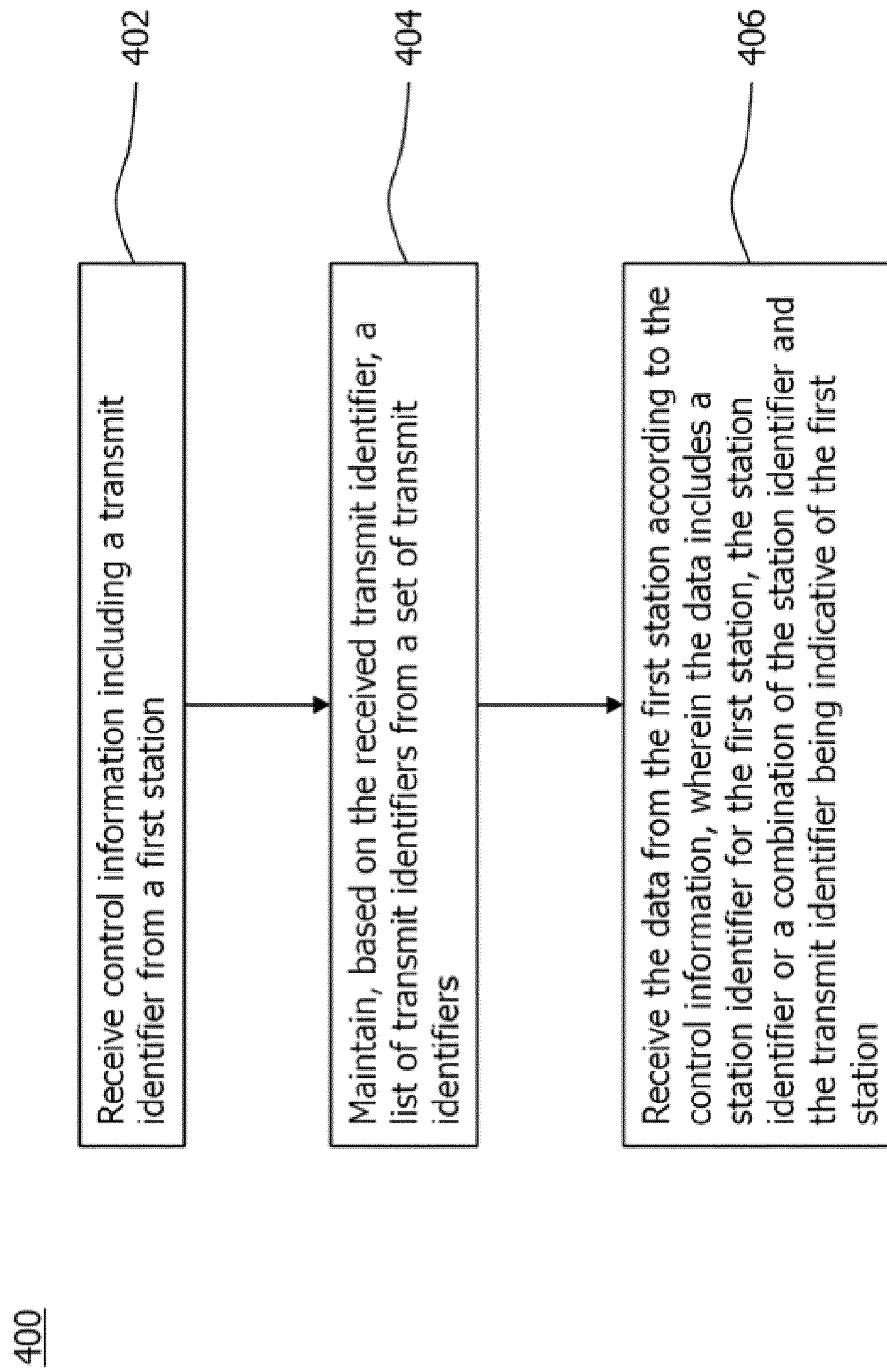
FIG. 4 shows a flowchart for a method of receiving data from a first station at a second station on a contention-based radio channel, which is implementable by the device of FIG. 2.

FIG. 4 shows a flowchart for a method 400 of receiving data from a first station at a second station on a contention-based radio channel. The method 400 comprises a step 402 of receiving control information including a transmit identifier from the first station; a step 404 of maintaining, based on the received transmit identifier, a list of transmit identifiers from a set of transmit identifiers; and a step 406 of receiving the data from the first station according to the control information, wherein the data includes a station identifier for the first station, the station identifier or a combination of the station identifier and the transmit identifier being indicative of the first station.

The method 400 may be performed by the device 200, e.g., at the second station. For example, the module 202 may perform the steps 402 and 406. The module 204 may perform the step 404.

The step 404 may be performed in response to receiving the control information in the step 402, e.g., for indicating in the list those transmit identifiers for which a transmission of data is expected according to the step 406. Alternatively or in addition, the step 404 may be performed after the step 406, e.g., for maintaining in the list those transmit identifiers for which data has been unsuccessfully received. Receiving a further transmission of data that is related to one of those transmit identifiers may be used for soft-combing the data transmissions.

The second station may receive multiple data receptions 406 from different first stations in the radio network. Each reception of the data in the step 406 may be unambiguously related to one reception of the control information in the step 402, e.g. independently of the transmit identifier and the station identifier.

In one implementation, the control information includes a reference to radio resources of the data transmission 306 and 406. For example, the control information in the steps 304 and 402 specifies time and/or frequency for receiving the data transmission in the steps 306 and 406, e.g. in terms of radio resource blocks used for the data transmission. A resource allocation field in the control information may indicate to the second station a set of (e.g., contiguously allocated resource blocks). The resource allocation field in the control information includes of a resource indication value (RIV) corresponding to a starting resource block and a length in terms of contiguously allocated resource blocks.

In same or another implementation, the control information (in the steps 304 and 402) and the data (in the steps 306 and 406) are related by means of a datagram structure or frame structure (e.g., on the physical layer or the data link layer of a communication protocol of the radio network). For example, the control information and the data are transmitted in the same message and/or in the same subframe. The data may be transmitted a predefined number of transmission symbols (e.g., 3 or 4 transmission symbols) after transmitting the control information.

The contention-based radio channel may comprise radio resources defined in time and/or frequency. Radio resources of the contention-based radio channel are accessed by stations in the radio network (e.g., including the first station) according to a contention process and/or without centralized scheduling (e.g., without scheduling grants from the second station). The contention-based radio channel may also be referred to as a contention-based Physical Channel (cPDCH).

The data transmission in the steps 306 and 406 may be referred to as an uplink data transmission. The control information may be referred to as uplink control information (UCI).

The contention-based radio channel may also be used by the second station for a downlink data transmission, e.g., to the first station. For the downlink data transmission, the first station may be configured to perform the method 400, and the second station may be configured to perform the method 300. The control information may be referred to as downlink control information (DCI).

The control information may be transmitted on the contention-based radio channel or a different control channel exclusively carrying control messages. In one variant, the control channel and the contention-based radio channel may partially overlap or comprise the same subcarriers in the frequency domain. The control channel and the contention-based radio channel may be separated or delimited in the time domain. For example, the control channel and the contention-based radio channel may be consecutive in the time domain. In another variant, the control channel and the contention-based radio channel may be separated or delimited in the frequency domain. For example, the contention-based radio channel may in unlicensed radio spectrum and the control channel may be in licensed radio spectrum.

The contention-based radio channel may be a radio channel that is accessed by or accessible to the stations of the radio network for transmission, and potentially further transmitters not belonging to the radio network, without pre-coordination and/or without a centralized coordination. The radio channel may be contention-based in that the data transmission is unscheduled. E.g., the data transmission may be decided by the device 100 or the first station. The data transmission may not require receiving a scheduling grant from another station in the radio network, e.g., the second station receiving the data transmission and/or a base station controlling radio access in the radio network.

The first station may be a wireless device, e.g., a user equipment (UE) or a device without user interface. The second station may be a node of a radio access network (RAN), e.g., a base station. In a 3GPP implementation of the RAN, the second station may control or comprise a 5G base station, an LTE evolved Node B (eNB) and/or a radio head for 5G or LTE.

The technique may be implemented by introducing a transmit identifier, e.g., in addition to an (e.g., existing) station identifier. The transmit identifier is obtained by the first station in the step 302 that wishes to transmit on the contention-based radio channel. The transmit identifier is indicated by means of the control information to the second station according to the steps 304 and 402. The control information may include the transmit identifier explicitly as a field of bits (e.g., transmitted in a bit field defined for the transmit identifier) and/or the transmit identifier may be scrambled with a CRC value of the control information (e.g., transmitted in a bit field defined for the CRC value).

The cardinality, N, of the set or the number of transmit identifiers, N, in the set (e.g., the number of numerically possible transmit identifiers, $N=2^k$, using k bits for representing each transmit identifier) may be less than, preferably a fraction (e.g., less than one hundredth) of, a size M of the radio network. The size may be the number of first stations, M, in the radio network and/or the number of station identifiers, M (e.g., the number of numerically possible station identifiers, $M=2^j$, using j>k bits for representing each station identifier). Hence, less bits are required for the transmit identifier than for a conventional station identifier.

In one implementation, the number of transmit identifiers, N, in the set is proportional to the (e.g., maximum) number of first stations, M, in the radio network. In same or another implementation, the ratio M/N may be determined depending on an average rate, $\lambda$, of data transmissions (e.g., each according to the steps 306 and 406) per first station.

Based on the transmit identifier, the second station is configured to distinguishing data transmissions on the contention-based radio channel from different first stations each transmitting according to the method step 306, e.g., within a transmit identifier time T.

Alternatively or in addition, based on the transmit identifier, the second station is configured to correctly combine the data received in one instance of the method steps 402 and 406 with retransmitted data received from the same first station in another instance of the method steps 402 and 406.

The transmit identifier time T may define a maximum lifetime for each transmit identifier. For example, each of the first station and the second station may release the transmit identifier after expiry of the transmit identifier time T for that transmit identifier.

The transmit identifier time T may be a predefined time period. Alternatively or in addition, the transmit identifier time T may be determined based on the average rate, $\lambda$, of data transmission events (according to the steps 306 and 406) per first station. The rate $\lambda$ of data transmissions per first station may also be referred to as station activity. As a further alternative or in addition to any of afore-mentioned alternatives, the transmit identifier time T may be determined based on a time difference between transmission and retransmission (e.g., the minimum or average time difference for the first station).

Alternatively or in addition, at least one of the cardinality N of the set and/or the transmit identifier time T may be determined such that a probability of two or more equal transmit identities obtained (according to the step 302) and/or received (according to the step 402) within the transmit time period T (which is also referred to as colliding transmit identifiers) is below a predefined collision threshold, $p_{threshold}$:

$$p(N,T) \leq p_{threshold}. \quad (1)$$

The probability of two (or more) equal transmit identities within the transmit time period T may be computed or estimated.

By way of example, the probability for obtaining (according to the step 302) n transmit identifiers at different first stations and/or receiving (according to the step 402) n transmit identifiers from different first stations within the transmit time period T is $$p'(n, M \cdot \lambda \cdot T) = \frac{(M \cdot \lambda \cdot T)^n}{n!} \cdot e^{-M \cdot \lambda \cdot T} \quad (2)$$

for independently operating first stations. In Eq. (2), the average rate of data transmissions (e.g., each according to the steps 306 and 406) per first station is $\lambda$, and the (e.g., maximum or current) number of (e.g., connected or connectable) first stations in the radio network is M.

The probability that two or more of the n transmit identifiers are equal is $$p''(n, N) = 1 - \frac{N!}{(N-n)! \cdot N^n} \text{ for } n \leq N \text{ and} \quad (3)$$
$$= 1 \quad \text{for } n > N,$$

wherein the transmit identifiers are independently obtained from the set of N transmit identifiers.

The probability that two or more transmit identifiers within the transmit identifier time are equal is $$p(N,T) = \Sigma_{n=0}^{\infty} p'(n, M \cdot \lambda \cdot T) \cdot p''(n,N). \quad (4)$$

By increasing N, the probability for colliding transmit identifiers is reduced. For example, the second station determines for given values of the radio network size M, the station activity $\lambda$ and the transmit identifier lifetime T (e.g., predefined at the deployment of the radio network) a value N that is smaller than M and fulfills Eq. (1).

The transmit identifier does not uniquely identify the first stations in the radio network. Different first stations in the radio network may share the same transmit identifier. For example, the number of first stations, M, exceeds the number of transmit identifiers, N, in the set. Alternatively or in addition, each first station independently generates its transmit identifier (e.g., using a pseudo-random number generator). Different first stations using the same transmit identifier may be accepted by the second station, if the transmit identifier time periods of the different stations do not overlap. Reusing the transmit identifier, which is used by one first station, by another first station may be rejected by the second station, if the transmit identifier time of one first station (e.g., for the earliest use of said transmit identifier) has not yet expired.

A device 100 implementing the technique also indicates its station identifier in the transmitted data (e.g., the data part carried by the cPDCH), so that at least the combination of transmit identifier and station identifier is unique in the radio network. In one variant, the second station may determine an identity (e.g., the RNTI) of the first station based solely on the station identifier. In another variant, the second station may determine the identity of the station based on both the transmit identifier carried in the control information and the station identifier carried in the data.

Figure 5:
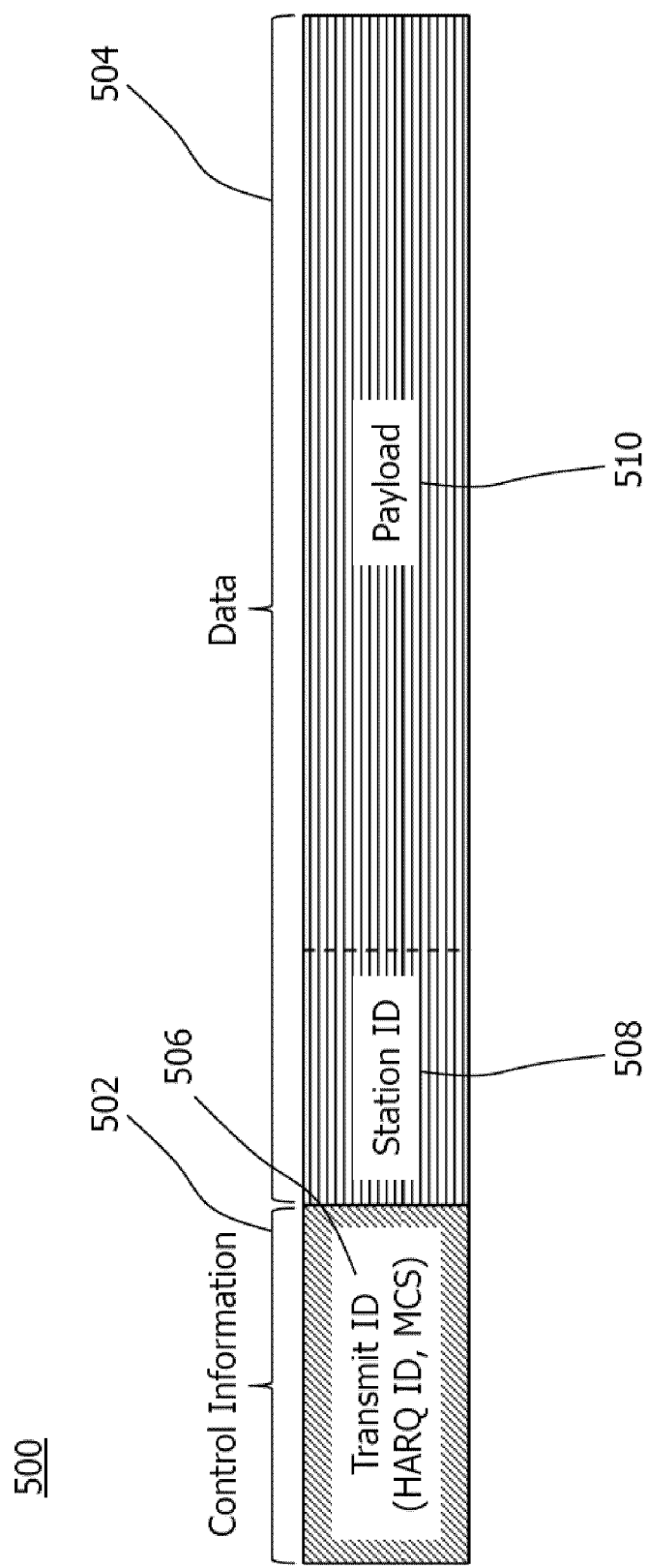
FIG. 5 schematically illustrates an example of a message for transmitting the data and receiving the data according to the methods of FIGS. 3 and 4, respectively.

FIG. 5 schematically illustrates an example for a transmission message 500 including both the control information 502 and the data 504. The transmit identifier 506 is included, e.g., scrambled, in the control information 502. The station identifier 508 is included, e.g., encoded, in the data 504 together with the payload 510. Any identifier may also be referred to as an identity or ID.

In one implementation, the message 500 is transmitted by means of transmission symbols transmitted in a temporal order from left to right in FIG. 5. In addition or in another implementation, the control information 502 and the data 504 are transmitted within one radio frame or subframe. For example, the control information is transmitted in radio resources of the control channel prior to transmitting the data on the contention-based radio channel (e.g., cPDCH). A transmission format used for the control information 502 provides more redundancy and robustness than a transmission format used for the data 504.

In addition to the transmit identifier 506, the control information is optionally indicative of a transmission format, e.g., a modulation and coding scheme (MCS), for the associated data transmission in the steps 306 and 406. The transmission format specifies modulation, coding rate and/or rank of the data transmission in the steps 306 and 406. By way of example, the transmission format specified by the control information 502 in an instance of the steps 304 and 306 for the transmission of the data 504 may be less robust than the transmission format specified by the control information 502 in a later instance of the steps 304 and 306 for a retransmission of the data 504.

The first station preferably performs rate-adaptation. The transmission format in the control information 502 is dynamically adapted to a current radio condition, e.g. a channel capacity or radio quality of the contention-based radio channel.

Optionally, the control information 502 is further indicative of a Hybrid Automatic Repeat Request (HARQ) process identifier, e.g., for soft-combining multiple instances of the data transmissions 306. The HARQ process identifier may be identical with, or implied by, the transmit identifier 506.

The control information 502 may further include a channel indicator specifying the channel for the data transmission. For example, one instance of the data transmission 306 is on the contention-based radio channel (e.g., in unlicensed spectrum), which may be a default configuration in the absence of the channel indicator in the corresponding control information 502 in the step 304. The channel indicator in the control information 502 associated with a later instance of the step 306 for the retransmission of the data 504 may specify another (e.g., more robust or contention-free) radio channel (e.g., in licensed spectrum).

The second station may comprise a plurality of HARQ buffers (e.g., N or less HARQ buffers) for buffering soft-bits of the data reception 406. The second station maps the soft-bits (received in a transmission or retransmission) to the correct HARQ buffer based on the HARQ buffer identifier, e.g., based on the transmit identifier 506.

In one implementation, the first or only HARQ process of the first station is mapped the HARQ buffer at the second station solely based on the transmit identifier 506. In case of multiple HARQ buffers per first station, the control information 502 includes the HARQ buffer identifier in addition to the transmit identifier 506. The second station comprises a set of HARQ buffers per transmit identifier 506.

The control information 502 is protected by an error check (e.g., CRC) to determine decoding errors at the second station. Preferably, the transmit identifier 506 is scrambled with the CRC value included in the control information 502. This is efficient, since no additional bits have to be transmitted for the transmit identifier 506. Furthermore, since the number of transmit identifier 506, N, is smaller than the number of station identifiers, M, the number of (at most) N blind checks of the CRC value at the second station is limited.

The control information 502 may be transmitted with one of a predefined number of transmission formats (e.g., less than 10 or less than 5 formats), e.g., to limit the number of blind decoding attempts at the second station. The second station may be configured to blindly try all (e.g., possible) transmission formats and to determine if the CRC is positive using any one of the transmit identifiers 506 on the list maintained by the second station.

Figure 6:
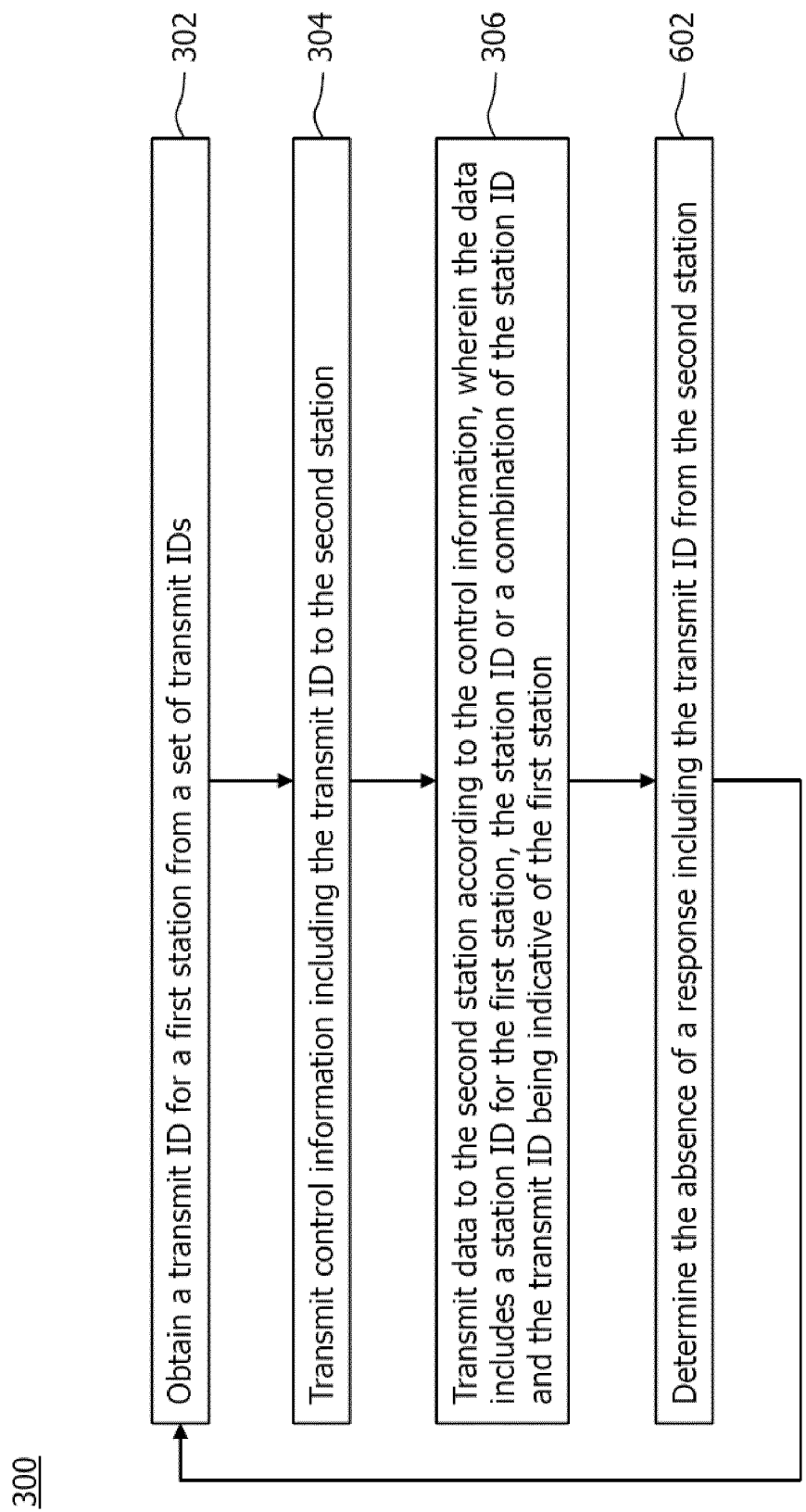
FIG. 6 shows a flowchart for a first implementation of the method of FIG. 3.

FIG. 6 shows a flowchart for a first implementation of the method 300. The method includes the steps 302 to 306. A response timer is started in the steps 304 and 306, e.g., as the message 500 is transmitted. In a step 602, after expiry of the response timer and/or if a message is received that implies that the second station has not received or processed the control information 502 in the steps 304 and 402, the first station repeats the steps 302 to 306.

The repeated transmission in the steps 304 and 306 uses the transmit identifier 506 obtained in the repeated step 302. Thus, a transmit identifier collision can be resolved. For example, the second station may not respond at all to a first station (e.g., identified by decoding the associated data 504 including the station identifier 508) using a transmit identifier that is currently in use by another one of the first stations (e.g., as indicated by the list maintained at the second station). Alternatively or in addition, the second station may respond to the first station using the same transmit identifier by transmitting a release message.

Figure 7:
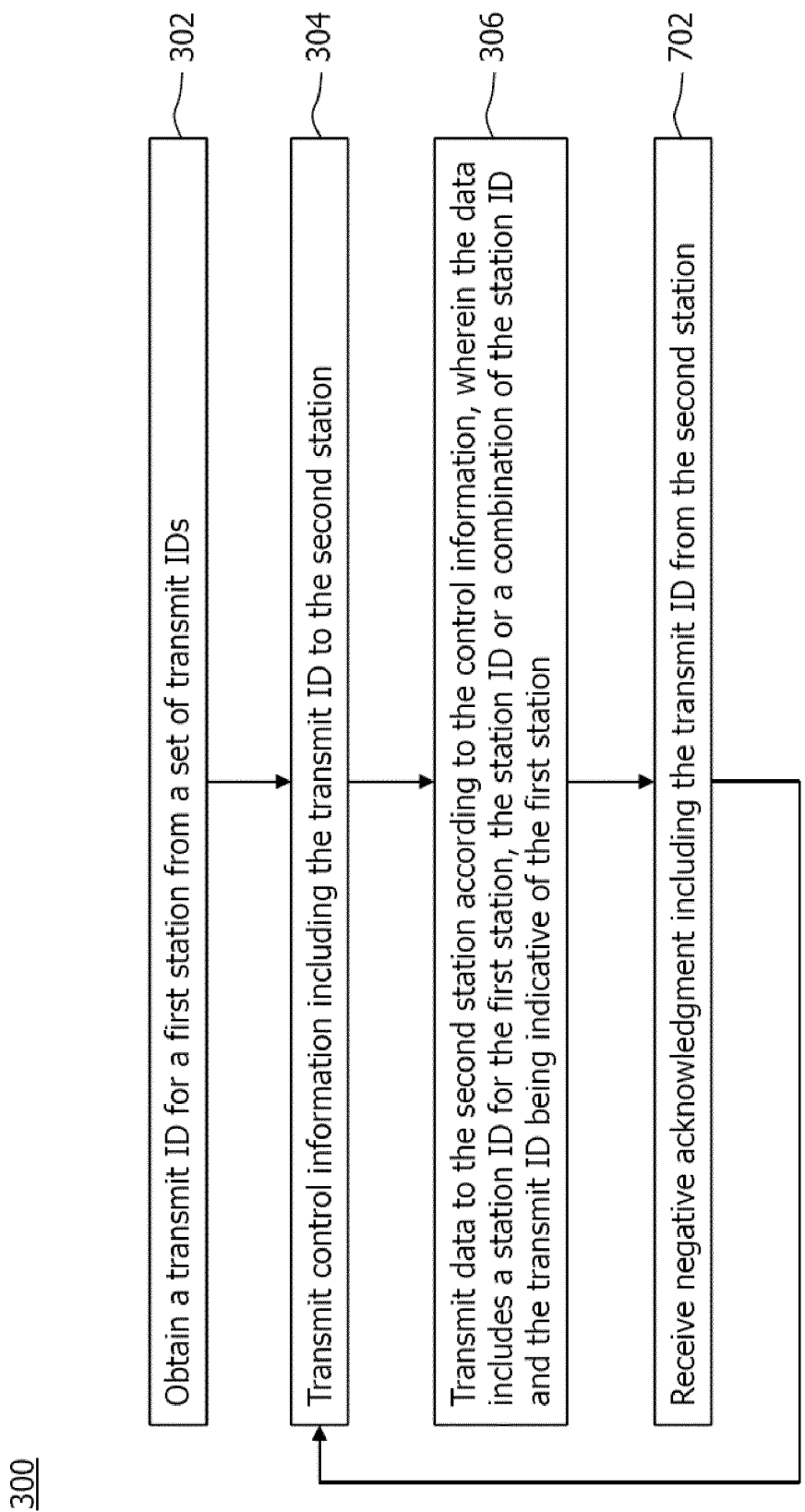
FIG. 7 shows a flowchart for a second implementation of the method of FIG. 3.

FIG. 7 shows a flowchart for a second implementation of the method 300. The method includes the steps 302 to 306. A message indicative of a negative acknowledgment (NACK) is received in a step 702, e.g., prior to expiry of the response timer. The NACK is related to the previous transmission in the steps 304 and 306 by including the transmit identifier 506.

The NACK implies that the second station has successfully received the control information 502 in the steps 304 and 402, and that the second station has not successfully received the data 504 in the steps 306 and 406. The first station repeats the steps 304 and 306. The transmit identifier 506 is maintained.

The second station receives in the repeated reception 402 the maintained transmit identifier 506. The second station searches the list for the received transmit identifier. As the second station finds the transmit identifier indicated in the list, the second station determines that the associated data reception in the repeated step 406 is a retransmission of the data 504. The second station combines the soft-bits stored in the HARQ buffer corresponding to the maintained transmit identifier 506 with the soft-bits of the retransmitted data. The second station decodes the combined soft-bits.

Figure 8:
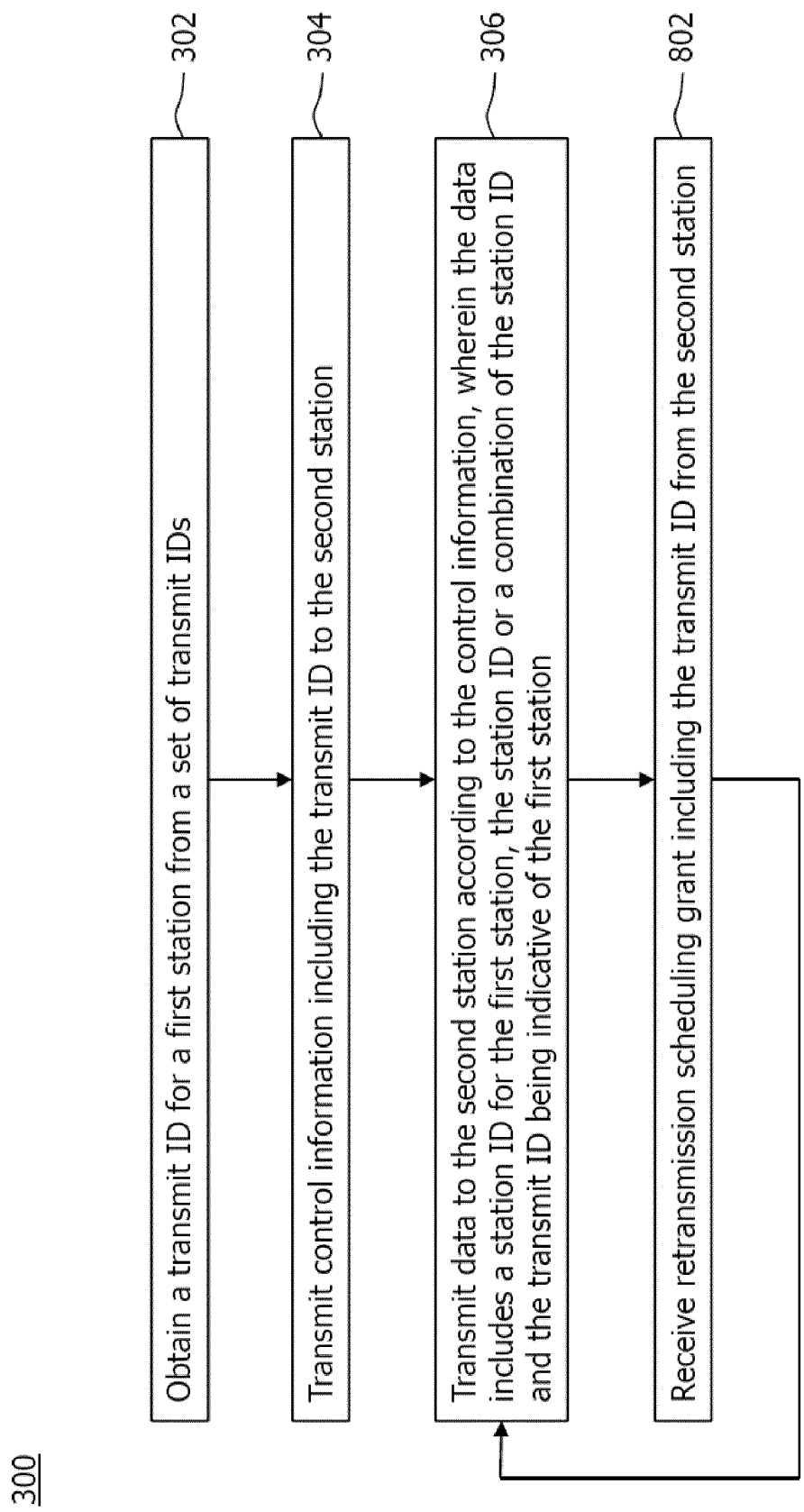
FIG. 8 shows a flowchart for a third implementation of the method of FIG. 3.

FIG. 8 shows a flowchart for a third implementation of the method 300. The method includes the steps 302 to 306. A message indicative of a scheduling grant 802 is received. The message 802 is related to the previous transmission in the steps 304 and 306 by including or implying the transmit identifier 506.

The message 802 implies that the second station has successfully received the control information 502 in the steps 304 and 402, and that the second station has not successfully received the data 504 in the steps 306 and 406. The first station repeats the data transmission 306 according to the scheduling grant in the message.

The first station maintains the transmit identifier 506. The second station determines the retransmission and performs soft-combining, e.g., as described in the context of FIG. 7.

In one variant of the third implementation, the control information 502 is not retransmitted from the first station. The message 802 from the second station optionally specifies (e.g., partly or compactly) a transmission format for the data retransmission in the repeated step 306. In another variant, the control information 502 is also retransmitted in a repeated step 304, e.g., if the communication protocol requires the combined transmission 304 and 306 of the entire message 500, and/or if the first station performs rate-adaptation.

Figure 9:
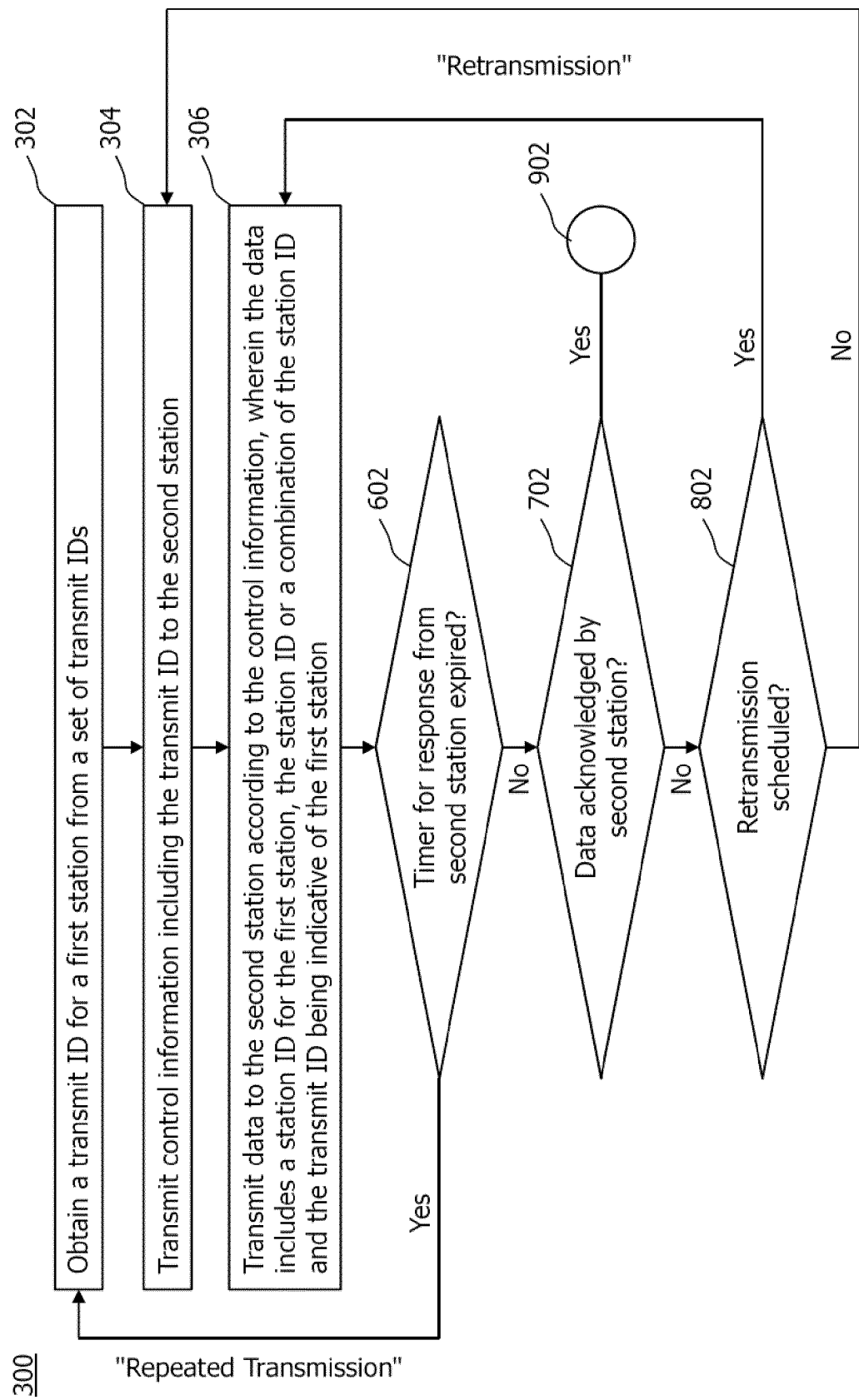
FIG. 9 shows a flowchart for a fourth implementation of the method of FIG. 3.

FIG. 9 shows a flowchart of a fourth implementation of the method 300. The fourth implementation is an example for combining the implementations of the FIGS. 6 to 8, or any subcombination thereof. In a state 902 of the method 300, if an initial data transmission (in the step 306) or a successful retransmission of the data (in the repeated step 306) is acknowledged by the second station (e.g., expressly by an ACK message from the second station or implicitly by a release message), the transmit identifier may be released.

Transmitting the same data by repeating at least the step 306, without maintaining the transmit identifier used in previous transmission of the data, may be referred to as a repeated transmission. Transmitting the same data by repeating at least the step 306, while maintaining the transmit identifier used in the previous transmission of the data, may be referred to as a retransmission.

Figure 10:
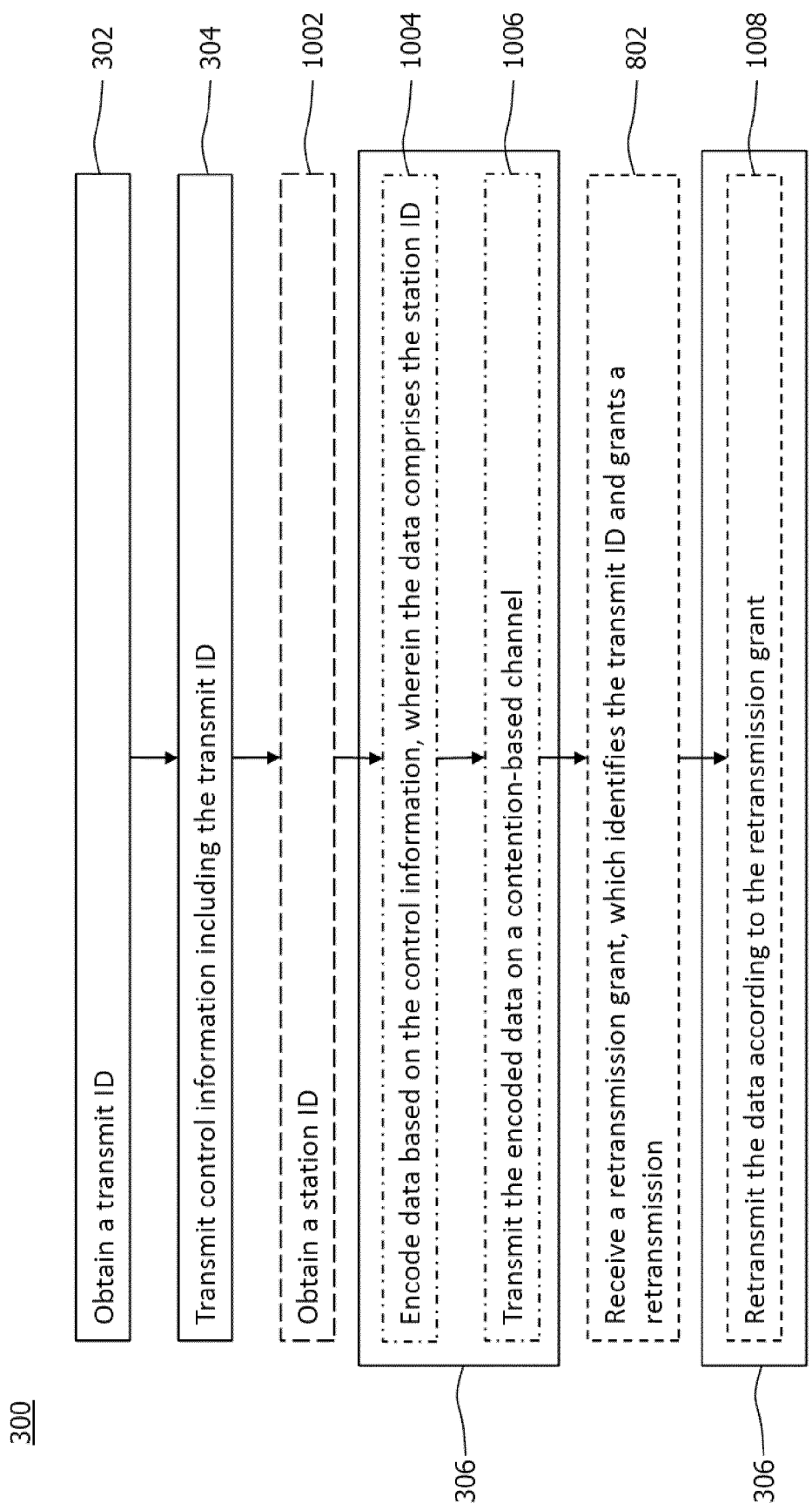
FIG. 10 shows a flowchart for a fifth implementation of the method of FIG. 3.

FIG. 10 illustrates a flowchart of a fifth implementation of the method 300. Optional steps are shown with differently dashed lines. Each of the optional steps and/or the implementation details of the fifth implementation of the method 300 can be applied to any one of the other method implementations.

The first station obtains a transmit identifier 506 in the step 302. In some embodiments, the first station selects a random transmit identifier 506 from the configured set of transmit identifiers. For example, the first station draws a new transmit identifier for each transmission of new data on the contention-based radio channel. The first station optionally implements a mechanism for releasing the drawn transmit identifier 506, e.g., so that the same transmit identifier may be used by one or more other first stations in the radio network.

The first station transmits in the step 304 the control information 502. The control information 502 is encoded or generated based on the obtained transmit identifier 506.

In one variant, the encoded control information 502 comprises the transmit identifier 506 explicitly, e.g., as a bit field. In another variant, the encoded control information 502 comprises the transmit identifier 506 implicitly, e.g., by scrambling the transmit identifier 506 with the CRC value protecting the control information 502.

In a further variant, the transmission 304 of the control information 502 includes the transmit identifier 506 by encoding the transmit identifier by means of one or more reference signals. For example, a reference signal associated with the transmit identifier 506 is transmitted in the control information 502 in the step 304. The reference signal may in some embodiments include a demodulation reference signal.

The first station obtains a station identifier 508 (also referred to as user identifier) in a step 1002. The station identifier 508 may be a unique identity (e.g., a UE identity). The station identifier 508 for the first station may be obtained, e.g., using a subscriber identity module (SIM) collocated with the first station (e.g., an International Mobile Subscriber Identity or IMSI) and/or an identifier received from the second station (e.g., a Radio Network Temporary Identifier or RNTI). Thus, the station identifier uniquely specifies the first station within the radio network.

Optionally, the transmit identifier 506 comprises a (e.g., proper) subset of the bits representing the unique identity. The station identifier 508 comprises the complementary (or remaining) bits representing the unique identity. In such embodiments, the transmit identifier 506 and station identifier 508 together yield or correspond to the unique identity.

In a substep 1004 of the step 306, the first station encodes user data 504 based on the transmitted control information 502. The user data 504 comprises the obtained station identifier 508. The encoded user data 504 is transmitted on the contention-based radio channel in a substep 1006 of the step 306.

The first station may then receive a retransmission grant, e.g., on a physical data control channel (PDCCH), in a step 802. The step 802 may be a trigger for a repeated instance 1008 of at least the step 306 using the radio resource indicated in the retransmission grant.

The retransmission grant is indicative of the transmit identifier 506 for the first station. The retransmission grant is granting a retransmission on the contention-based radio channel (cPDCH) or another physical data channel (PDCH). The first station then retransmits the encoded data on the PDCH or cPDCH in the repeated instance of the step 306.

The step 304 may not be repeated. For example, the retransmission grant specifies the radio resource (e.g., in time and/or frequency), so that the data retransmission instance 1008 at this radio resource implies the transmit identifier 506.

Figure 11:
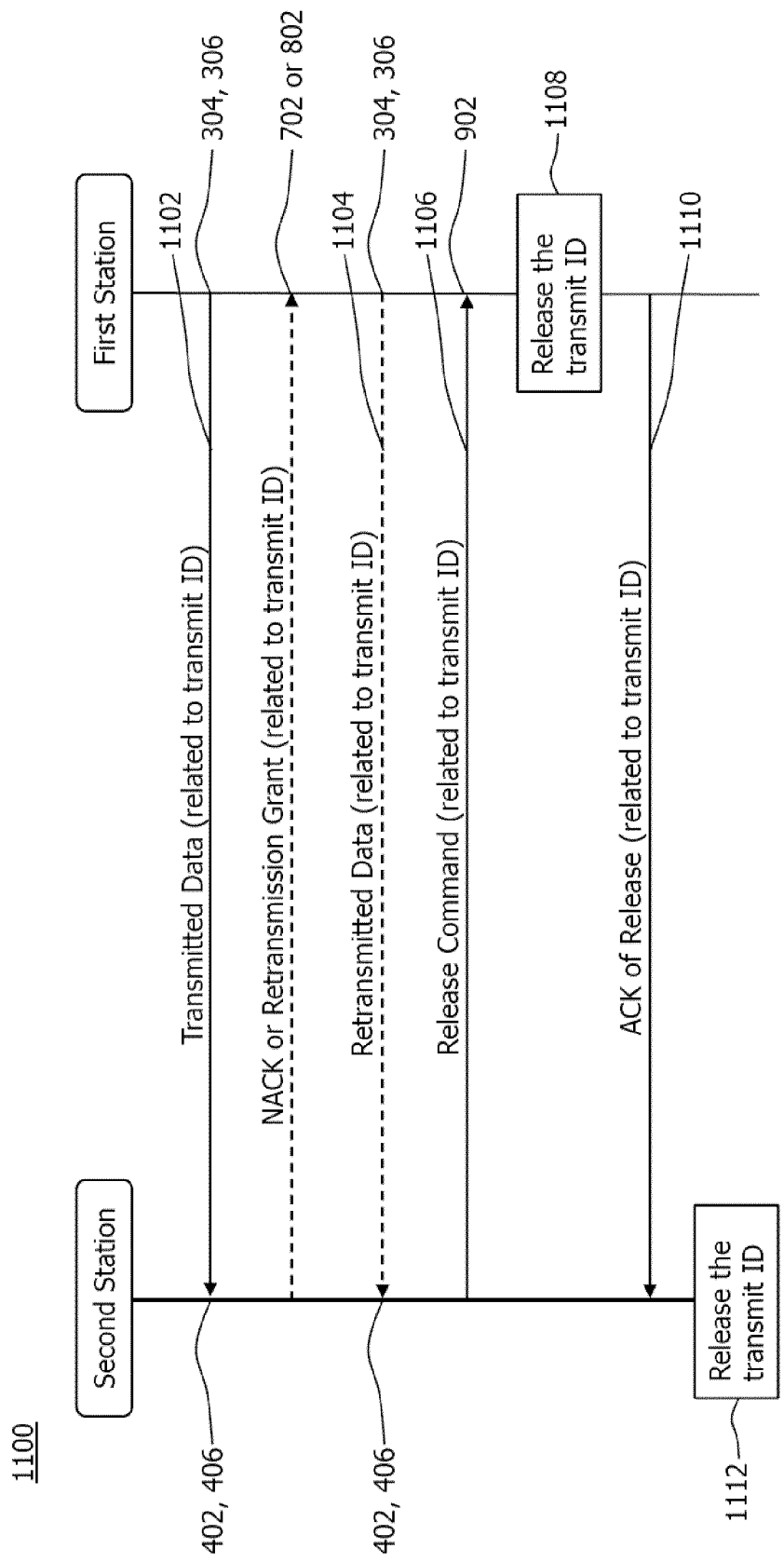
FIG. 11 shows a first example of a signaling diagram for a radio communication involving the devices of FIGS. 1 and 2.

FIG. 11 shows a schematic signaling diagram 1100, which may result from a first station performing the method 300 and a second station performing the method 400 in mutual radio communication. FIG. 11 provides a first embodiment of the release mechanism for releasing the transmit identifier 506. The transmit identifier 506 may be released by signaling from the second station. The signaling may be explicit or implicit as to a release command.

In the steps 304 and 306, the first station transmits data 1102 that is related to the transmit identifier 506 of the first station, e.g. by transmitting the message 500 including explicitly or implicitly the transmit identifier 506.

Depending on whether or not the initial data transmission 306 is decodable at the second station, the second station responses by transmitting a NACK message 702 or a retransmission grant 802. This triggers the retransmission of data 1104, e.g., the very same message 500 or a message 500 including another redundancy version of the same data 504.

In a first variant, as soon as the data is successfully received at the second station in the step 406, the second station transmits a release command in a control message 1106 including or implying the transmit identifier 506. The control message 1106 may further include the ACK for the data. Alternatively, the control message 1106 is an ACK message for the data 504 that implies the release command. As a further alternative, the control message 1106 including the release command without sending a NACK or retransmission grant implies the ACK for the data 504.

The reception of the control message 1106 sets the first station in the state 902. The first station releases the transmit identifier 506 responsive to the control message 1106.

Completion of the release at the side of the first station is reported to the second station in a Release ACK message 1110. The second station releases the transmit identifier 506 responsive to the Release ACK message 1110, which includes deleting the corresponding entry in the list maintained at the second station.

In second variant, which is combinable with the first variant, the second station transmits the control message 1106 including or implying the release command for the transmit identifier 506 responsive to detecting a contention. E.g., the first station has transmitted in the step 304 a transmit identifier 506 that is already used (and, e.g., not yet released) by another first station in the radio network. The contention may be resolved by transmitting the release signal to the first station that has transmitted control information including the transmit identifier 506 later than another first station.

In the second variant, the control message 1106 may be realized by a NACK message from the second station without sending a retransmission grant. This realization of the control message 1106 implies for the first station to start over by releasing the current transmit identifier 506 and to obtain a new transmit identifier 506 by repeating the method 300. Alternatively or in addition, the control message 1106 may be realized by a message indicating contention collision for the transmit identifier 506.

Figure 12:
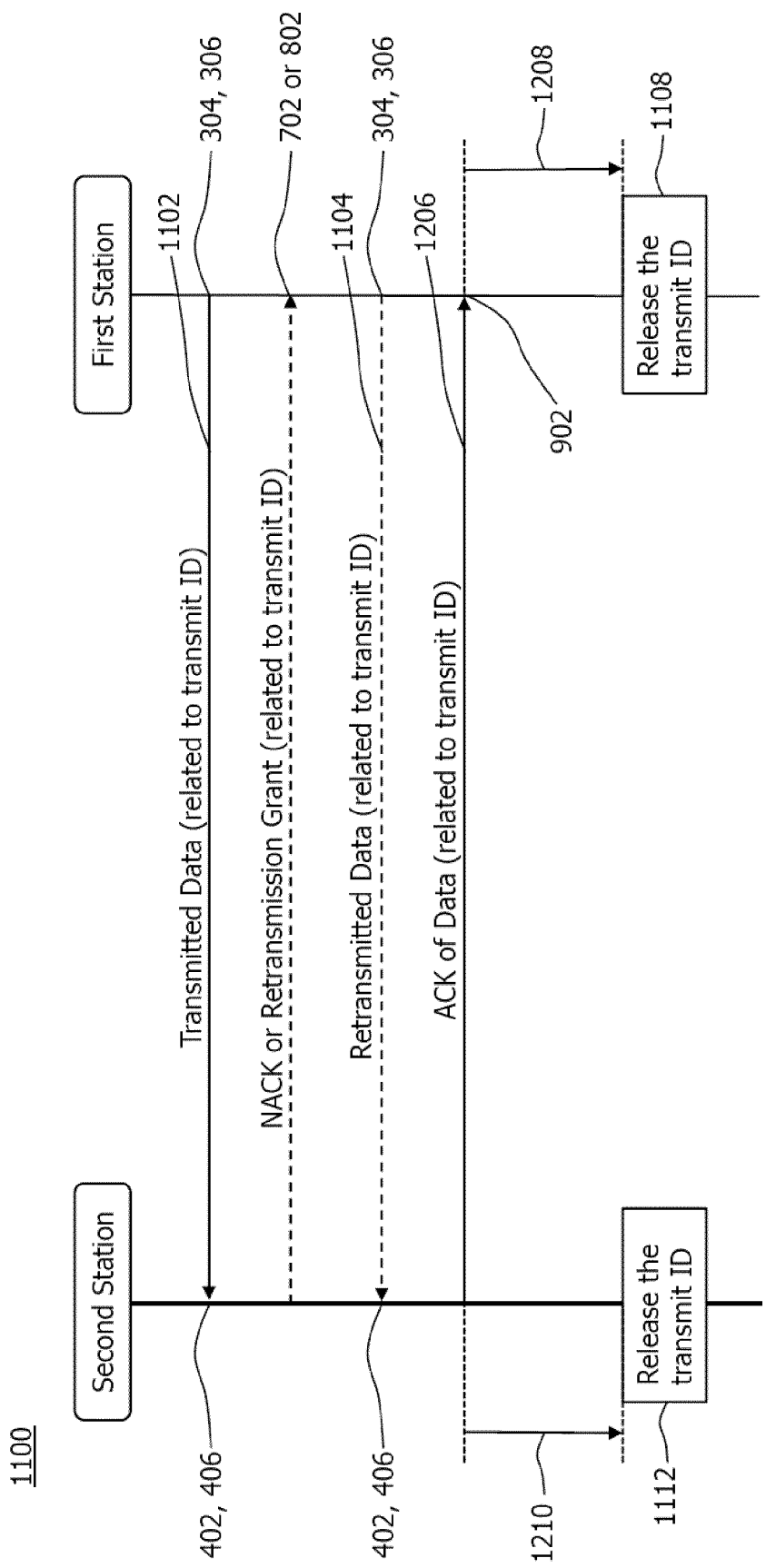
FIG. 12 shows a second example of a signaling diagram for a radio communication involving the devices of FIGS. 1 and 2.

FIG. 12 shows a schematic signaling diagram 1100, which may result from a first station performing the method 300 and a second station performing the method 400 in mutual radio communication. Reference signs corresponding to those of FIG. 11 refer to equal or exchangeable features. FIG. 12 provides a second embodiment of the release mechanism for releasing the transmit identifier 506. The transmit identifier 506 may be released by a timer.

In a first variant, a transmit identifier timer 1208 is started (and, optionally, restarted) when an ACK message 1206 for the data 504 (or a NACK message in the step 702 or a retransmission grant in the step 802) is received. Upon expiry of the transmit identifier timer 1208, the transmit identifier 506 is released in the step 1108. Thus, the transmit identifier 506 is maintained as long as the transmission process is not yet successfully completed and has not yet failed by time lapse. The transmit identifier 506 is released after completion of the data transmission or failure by time lapse.

A corresponding timer 1210 may be started and, optionally, restarted at the second station for synchronous release 1112 at the second station, even without control signaling.

In a second variant that is combinable with the first variant, a response timer is started (and, optionally, restarted) at the transmission 306 of the data 504. The first station may not receive any response such as ACK or NACK. Upon expiry of the response timer, the first station starts over (e.g., by releasing the current transmit identifier 506) and using a new transmit identifier 506 (e.g., by repeating the method 300). For example, expiry of the response timer is determined in the step 602. This enables contention resolution handling (i.e., if two or more first stations have selected the same transmit identifier 506) in that the second station does not respond with an ACK or NACK.

Figure 13:
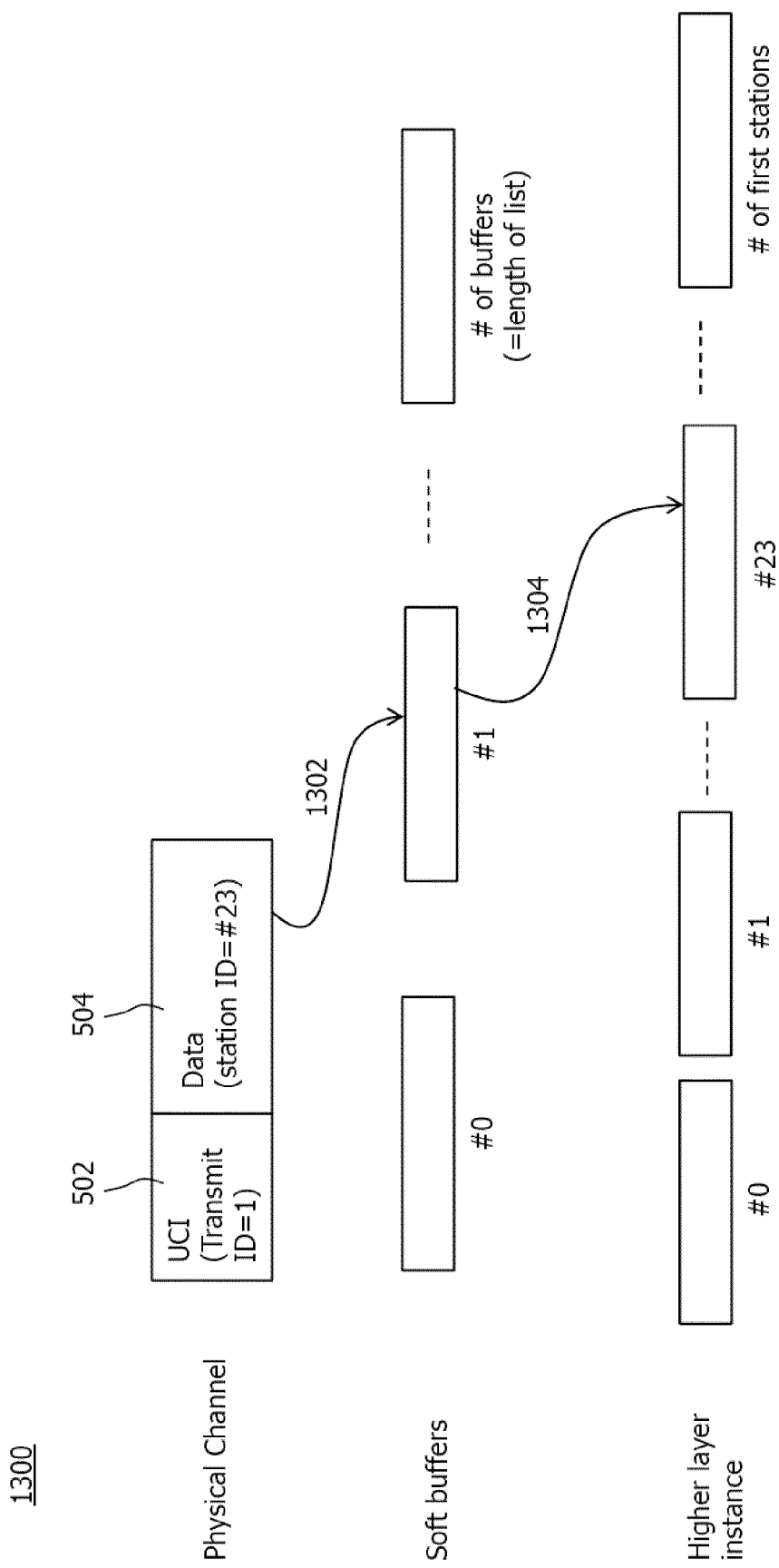
FIG. 13 shows a processing diagram for processing the message of FIG. 5 at the device of FIG. 2.

FIG. 13 shows a schematic processing diagram 1300 for the second station. Time increases from left to right. Layers of a communication protocol stack increase from top to bottom.

The second station receives the data 504 as part of the message 500 in the step 406 on the contention-based radio channel (cPDCH). The second station uses the transmit identifier 506 as an identifier for a soft-buffer during a data session with the first station. In a step 1302, data 504 is put in the soft-buffer ("#1") determined based on the transmit identifier 506 comprised in, or indicated by, the control information 502 for the data 504. No knowledge of the station identifier 508 ("#23") is required at this time at the second station.

If decoding of the data 504 received on the cPDCH fails, the second station may respond for the transmit identifier 506 with a NACK for the step 702 and/or a retransmission grant for the step 802. When the retransmission for the transmit identifier 506 is received, the second station performs a soft-combining of the original transmission and the retransmission. If the decoding succeeds, the second station obtains the station identifier 508 ("#23") for the first station from the decoded data.

The unique identity (e.g., the UE identity) for the first station is determined by the station identifier 508 (and, in some embodiments, in conjunction with the transmit identifier 506). Based on the station identifier, the decoded data is delivered to the correct higher layer instance in a step 1304.

If the second station receives two pieces of control information 502 indicating the same transmit identifier 506, the second station may proceed with contention resolution as described above.

Figure 14:
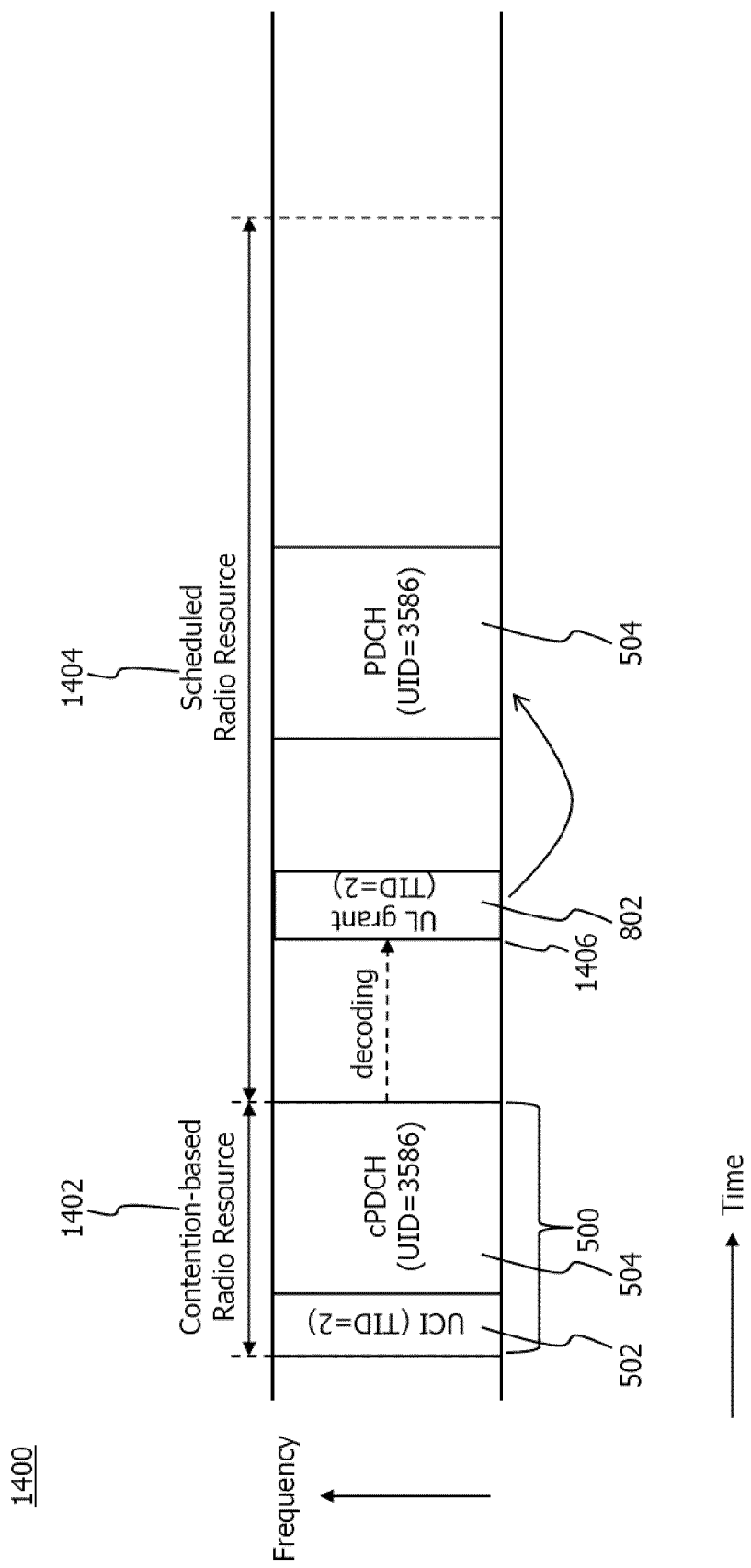
FIG. 14 shows a time-frequency grid of radio resources for a radio communication involving the devices of FIGS. 1 and 2.

FIG. 14 schematically illustrates an allocation of radio resources in time (on the horizontal axis) and frequency (on the vertical axis). For example, a plurality of subcarriers includes contention-based radio resources 1402 in a certain time frame. At a later (e.g., not adjacent) time, the same subcarriers include scheduled radio resources 1404.

In the steps 304 and 306, the first station with station identifier 508 (UID=3586) transmits the message 500 including control information 502 (UCI) for the transmit identifier 506 (TID=2) in the contention-based radio resources 1402. The second station starts decoding the data 504 as the time frame for contention-based radio resources 1402 has elapsed. At time 1406, the decoding fails or the CRC of the decoding result is negative. Thus, the second station transmits a scheduling grant for a certain time frame within the scheduled radio resources 1404.

Figure 15:
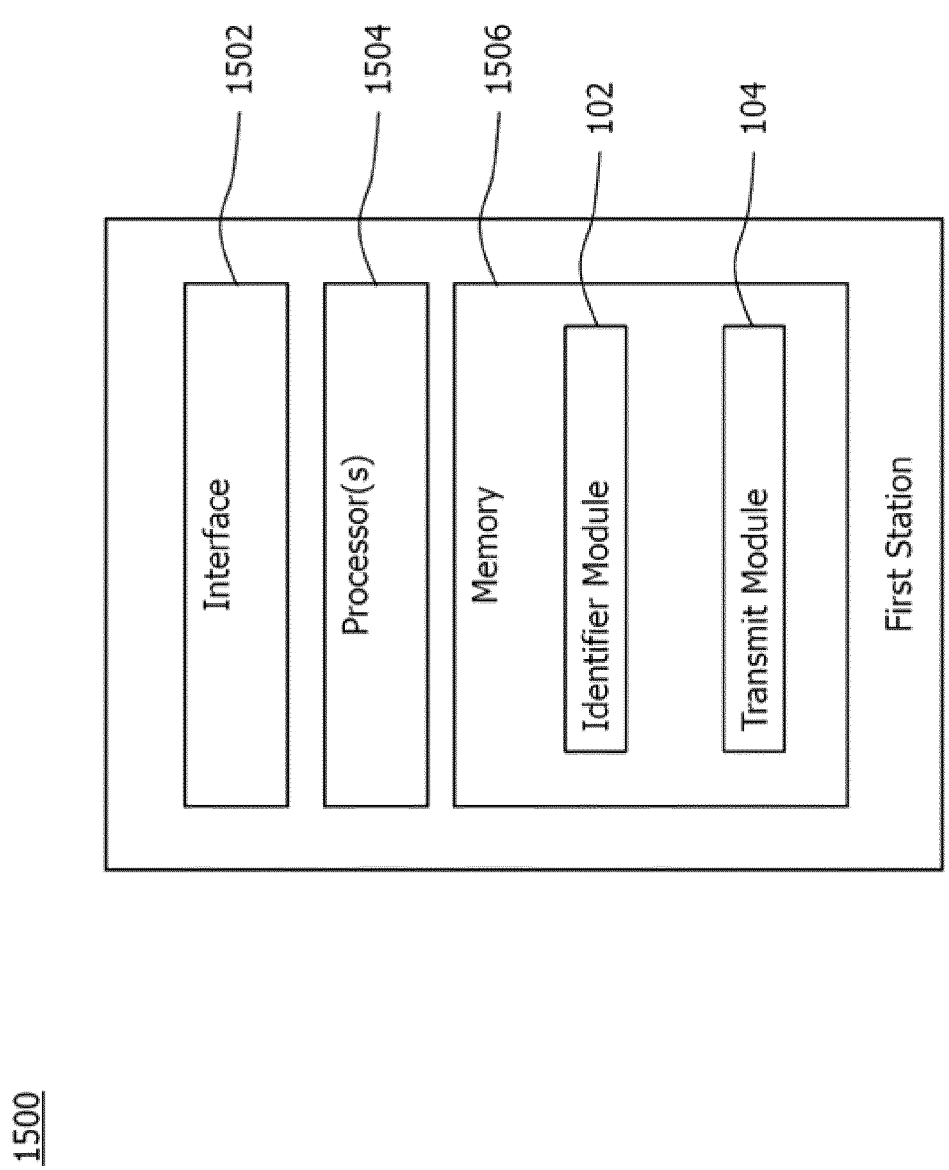
FIG. 15 shows a schematic block diagram of an embodiment of a first station for performing the method of FIG. 3.

FIG. 15 shows a block diagram for an embodiment of the first station 1500. The first station 1500 comprises an interface 1502 for radio communication, at least one processor 1504 and memory 1506. The processor 1504 is operatively coupled to the memory 1506 for executing instruction encoded in the memory 1506.

The memory 1506 is encoded with instructions for performing the functionality of the identifier module 102 and the transmit module 104.

Figure 16:
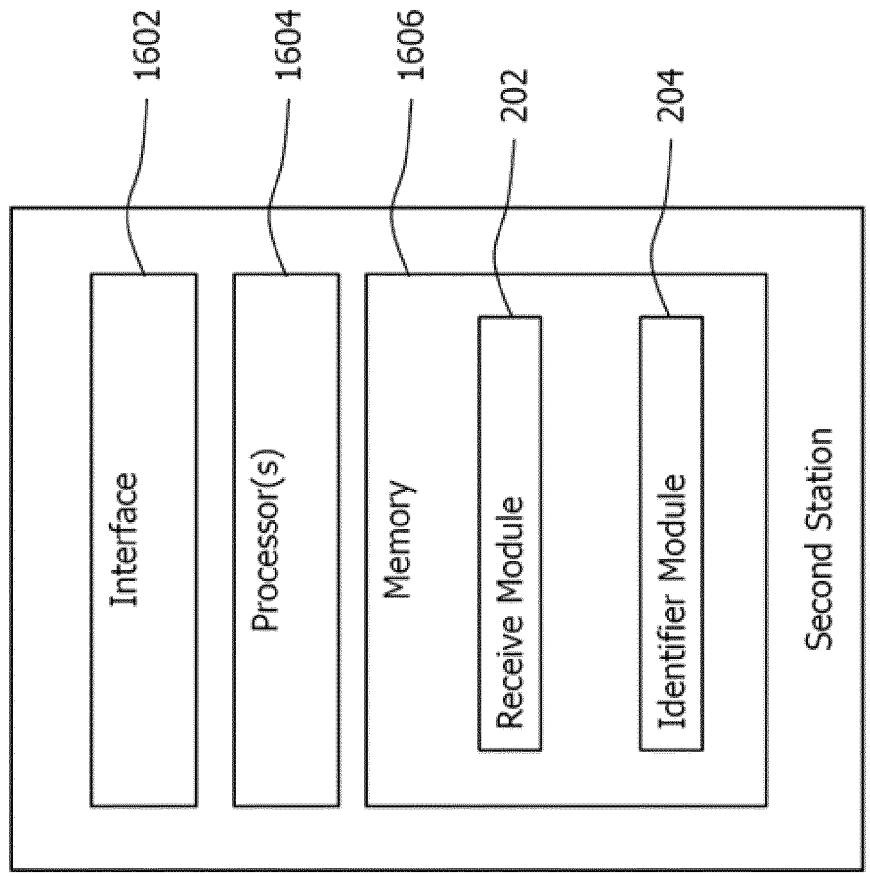
FIG. 16 shows a schematic block diagram of an embodiment of a second station for performing the method of FIG. 4.

FIG. 16 shows a block diagram for an embodiment of the second station 1600. The second station 1600 comprises an interface 1602 for radio communication, at least one processor 1604 and memory 1606. The processor 1604 is operatively coupled to the memory 1606 for executing instruction encoded in the memory 1606.

The memory 1606 is encoded with instructions for performing the functionality of the receive module 202 and the identifier module 204.

FIG. 17 schematically illustrates an embodiment of the radio network 1700. The radio network 1700 comprises at least one embodiment of the second station 1600 and two or more embodiments of the first station 1500. Each of the first stations 1500 is associated with the second station 1600. The second station 1600 is connected to a data network 1702, e.g., the Internet.

As has become apparent from above description of exemplary embodiments, the technique has several advantages, which can be realized separately or in combination.

By virtue of the technique, a radio network can comprise any number of stations without impairing spectral efficiency, e.g., if the average radio time of the radio network on the contention-based radio channel is limited.

Indicating the transmitting station explicitly in the control information message conventionally reduces spectral efficiency, since spectral efficiency is worse for control information transmissions than for data transmissions on a contention-based radio channel. For example, a robust format for the control information is often required for supporting retransmissions. The technique can be implemented to indicate the identity of the transmitting station on a contention-based radio channel without sacrificing spectral efficient.

The alternative of indicating the identity in the data would prohibit the use of soft-combining, which may limit the spectral efficiency of the contention-based radio channel. If the data cannot be decoded, the receiver has no knowledge of which station is the transmitter or that something was actually transmitted on the contention-based radio channel. The technique can be implemented to enable soft-combining of retransmissions on the contention-based radio channel.

Conventionally scrambling the station identity with a CRC value protecting the control information does not scale well for large number of stations, since a false detection rate for the control information increases with the number of stations. The technique can be implemented to limit the number of CRC attempts or blind decoding attempts at the receiving station of contention-based radio channel.

A transmitting station may determine its transmit identifier and/or start transmitting without requesting or receiving a scheduling grant, which can improve energy efficiency of specific wireless application, e.g., in home automation.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A device for transmitting data from a first station to a second station on a contention-based radio channel, the device comprising:
a processor and a memory, the memory containing one or more programs executable by the processor wherein the device is configured to:
obtain a transmit identifier for the first station from a set of transmit identifiers by receiving from the second station the set of transmit identifiers and generating, as the transmit identifier for the first station, at least one of a pseudo-random number from the set of transmit identifiers and a hash value in the set of transmit identifiers;
transmit control information including the transmit identifier to the second station according to a first transmission format; and
transmit the data to the second station according to the control information according to a second transmission format that is different from the first transmission format, wherein the first transmission format relates to a first modulation scheme and/or a first coding scheme and the second transmission format relates to a second modulation scheme and/or a second coding scheme, wherein the data includes a station identifier for the first station, the station identifier or a combination of the station identifier and the transmit identifier being indicative of the first station.

2. The device of claim 1, further configured to receive, and/or listen for receiving, a response to the data transmission from the second station, the response including or implying the transmit identifier for the first station, wherein the response includes or implies an acknowledgment, ACK, for the data being successfully received at the second station or a negative acknowledgment, NACK, for the data not being successfully received at the second station.

3. The device of claim 2, further configured to retransmit the data to the second station, wherein retransmitting the data includes retransmitting control information including the transmit identifier, wherein the transmitted data is encoded according to a first redundancy version indicated in the transmitted control information, and the retransmitted data is encoded according to a second redundancy version, which is other than the first redundancy version and indicated in the retransmitted control information.

4. The device of claim 3, wherein the data is retransmitted, if the response, or another message including the transmit identifier, includes or implies:
a negative acknowledgment, NACK, for the data not being successfully received at the second station; or
a scheduling grant for the retransmission.

5. The device of claim 3, wherein the data is retransmitted on a contention-free radio resource.

6. The device of claim 2, wherein the data transmission starts a response timer and, wherein the device is configured, upon expiry of the response timer without having received the response including the transmit identifier from the second station, to:
release the transmit identifier for the first station; and/or
repeat at least the transmission of the data from the first station to the second station.

7. The device of claim 2, configured to receive the response starts or restarts a transmit identifier timer, and further configured to, upon expiry of the transmit identifier timer, release the transmit identifier for the first station.

8. The device of claim 1, further configured to:
receive a control message from the second station for releasing the transmit identifier, wherein the control message includes or implies the transmit identifier; and
release the transmit identifier for the first station in response to the control message.

9. The device of claim 1, wherein a cardinality of the set of transmit identifiers is less than a number of stations associated with the second station.

10. The device of claim 1, wherein a size of the transmit identifier corresponds to a first number of bits, and a size of the station identifier corresponds to a second number of bits that is greater than the first number of bits.

11. The device of claim 1, wherein the control information is indicative of at least one of a modulation scheme, a coding scheme, a HARQ process number, new data and a redundancy version.

12. The device of claim 1, wherein the data is at least one of transmitted on a contention-based radio resource and retransmitted on a contention-based radio resource, wherein at least one of the transmissions and the retransmissions on the contention-based radio resource is based on a contention process, and wherein the contention-based radio resource uses unlicensed spectrum, and wherein the contention process comprises at least one of:
including the transmit identifier in the control information of the data transmission;
performing a clear channel assessment, CCA, of the contention-based radio resource; and
performing a backoff mechanism.

13. A device for receiving data from a first station at a second station on a contention-based radio channel, the device comprising:
a processor and a memory, the memory containing one or more programs executable by the processor wherein the device is configured to:
receive control information including a transmit identifier according to a first transmission format from the first station, the transmit identifier obtained by receiving from the second station a set of transmit identifiers and generating, as the transmit identifier for the first station, at least one of a pseudo-random number from the set of transmit identifiers and a hash value in the set of transmit identifiers;
maintain, based on the received transmit identifier, a list of transmit identifiers from a set of transmit identifiers; and
receive the data from the first station according to the control information, according to a second transmission format that is different from the first transmission format, wherein the first transmission format relates to a first modulation scheme and/or a first coding scheme and the second transmission format relates to a second modulation scheme and/or a second coding scheme, wherein the data includes a station identifier for the first station, the station identifier or a combination of the station identifier and the transmit identifier being indicative of the first station.

14. The device of claim 13, further configured to:
determine a transmit identifier from the set of transmit identities, which is not on the list, and
send the determined transmit identifier to the first station.

15. The device of claim 13, wherein the list is indicative of transmit identifiers for which control information has been successfully received and data has not been successfully received, the device further configured to:
buffer soft-bits representing the not successfully received data in association with the transmit identifier; and
transmit a negative acknowledgment, NACK, including the transmit identifier to the first station.

16. A method of transmitting data from a first station to a second station on a contention-based radio channel, the method comprising or triggering the following steps performed by the first station:

obtaining a transmit identifier for the first station from a set of transmit identifiers by receiving from the second station the set of transmit identifiers and generating, as the transmit identifier for the first station, at least one of a pseudo-random number from the set of transmit identifiers and a hash value in the set of transmit identifiers;
transmitting control information including the transmit identifier to the second station according to a first transmission format; and
transmitting the data to the second station according to the control information according to a second transmission format that is different from the first transmission format, wherein the first transmission format relates to a first modulation scheme and/or a first coding scheme and the second transmission format relates to a second modulation scheme and/or a second coding scheme, wherein the data includes a station identifier for the first station, the station identifier or a combination of the station identifier and the transmit identifier being indicative of the first station.

17. A method of receiving data from a first station at a second station on a contention-based radio channel, the method comprising or triggering the following steps performed by the second station:
receiving control information including a transmit identifier according to a first transmission format from the first station, the transmit identifier obtained by receiving from the second station a set of transmit identifiers and generating, as the transmit identifier for the first station, at least one of a pseudo-random number from the set of transmit identifiers and a hash value in the set of transmit identifiers;
maintaining, based on the received transmit identifier, a list of transmit identifiers from a set of transmit identifiers; and
receiving the data from the first station according to the control information according to a second transmission format that is different from the first transmission format, wherein the first transmission format relates to a first modulation scheme and/or a first coding scheme and the second transmission format relates to a second modulation scheme and/or a second coding scheme, wherein the data includes a station identifier for the first station, the station identifier or a combination of the station identifier and the transmit identifier being indicative of the first station.

* * * * *